United States Patent
Pang et al.

(10) Patent No.: US 10,477,551 B2
(45) Date of Patent: Nov. 12, 2019

(54) UPLINK DATA TRANSMISSION RESOURCE ALLOCATION METHOD AND APPARATUS USING LOAD BALANCING

(71) Applicant: HUAWEI TECHNOLOGIES CO., LTD., Shenzhen (CN)

(72) Inventors: Lingli Pang, Shanghai (CN); Xiaoxiao Zheng, Shanghai (CN); Xiaoying Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/832,159

(22) Filed: Dec. 5, 2017

(65) Prior Publication Data

US 2018/0098325 A1 Apr. 5, 2018

Related U.S. Application Data

(63) Continuation of application No. PCT/CN2015/081668, filed on Jun. 17, 2015.

(51) Int. Cl.
*H04W 4/00* (2018.01)
*H04W 72/04* (2009.01)
(Continued)

(52) U.S. Cl.
CPC ....... *H04W 72/0453* (2013.01); *H04W 48/20* (2013.01); *H04W 72/0413* (2013.01);
(Continued)

(58) Field of Classification Search
CPC ............. H04W 72/0453; H04W 48/20; H04W 72/085; H04W 74/08; H04W 28/26; H04W 72/04; H04W 72/0486
See application file for complete search history.

(56) References Cited

U.S. PATENT DOCUMENTS

2008/0242308 A1 10/2008 Gunnarsson et al.
2010/0195621 A1* 8/2010 Kekki .................. H04W 48/17
   370/332
(Continued)

FOREIGN PATENT DOCUMENTS

CN 103947253 A 7/2014
CN 103974266 A 8/2014
(Continued)

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.5.0 (Mar. 2015), Mar. 2015, pp. 1-445.

(Continued)

*Primary Examiner* — Abdelnabi O Musa
(74) *Attorney, Agent, or Firm* — Leydig, Voit & Mayer, Ltd.

(57) ABSTRACT

An uplink data transmission resource obtaining method and apparatus are provided. The method includes: sending, by user equipment, a resource obtaining request to a first network node, and receiving a resource obtaining response that is returned by the first network node in response to the resource obtaining request, where the resource obtaining request is used to obtain an uplink data transmission resource used to transmit uplink data; determining, by the user equipment according to the received resource obtaining response, a serving network node that provides an uplink data transmission resource for the user equipment, and determining the uplink data transmission resource that is provided by the serving network node for the user equipment; and sending, by the user equipment, uplink data by (Continued)

using the uplink data transmission resource provided by the serving network node.

20 Claims, 12 Drawing Sheets

(51) Int. Cl.
  *H04W 48/20*   (2009.01)
  *H04W 72/08*   (2009.01)
  *H04W 74/08*   (2009.01)
  *H04W 28/26*   (2009.01)

(52) U.S. Cl.
  CPC ......... *H04W 72/085* (2013.01); *H04W 74/08* (2013.01); *H04W 28/26* (2013.01); *H04W 72/04* (2013.01); *H04W 72/0486* (2013.01)

(56) References Cited

U.S. PATENT DOCUMENTS

| | | | | |
|---|---|---|---|---|
| 2010/0322118 A1* | 12/2010 | Fang | .................... | H04W 36/08 370/280 |
| 2010/0330998 A1* | 12/2010 | Park | ................. | H04W 36/0055 455/436 |
| 2012/0002643 A1* | 1/2012 | Chung | ................. | H04J 11/0093 370/331 |
| 2012/0314652 A1 | 12/2012 | Ahn et al. | | |
| 2013/0077599 A1 | 3/2013 | Dimou et al. | | |
| 2013/0163441 A1 | 6/2013 | Verma et al. | | |
| 2014/0161086 A1* | 6/2014 | Tamura | ................. | H04W 72/14 370/329 |
| 2014/0233530 A1 | 8/2014 | Damnjanovic et al. | | |
| 2016/0234713 A1 | 8/2016 | Lin et al. | | |

FOREIGN PATENT DOCUMENTS

| | | |
|---|---|---|
| WO | 2010022070 A1 | 2/2010 |
| WO | 2015058379 A1 | 4/2015 |

OTHER PUBLICATIONS

Extended European Search Report issued in corresponding European Patent Application No. 158952192, dated Feb. 1, 2018, 9 pages.

International Search Report (including English translation) issued in corresponding International Application No. PCT/CN2015/081668, dated Mar. 14, 2016, 6 pages.

* cited by examiner

UPLINK DATA TRANSMISSION RESOURCE ALLOCATION METHOD AND APPARATUS USING LOAD BALANCING

CROSS-REFERENCE TO RELATED APPLICATIONS

This application is a continuation of International Application No. PCT/CN2015/081668, filed on Jun. 17, 2015, the disclosure of which is hereby incorporated by reference in its entirety.

TECHNICAL FIELD

Embodiments of the present disclosure relate to the field of wireless communications technologies, and specifically, to an uplink data transmission resource obtaining method and apparatus.

BACKGROUND

Rapid development of wireless access technologies results in a complex wireless network topology structure. In a same coverage area, multiple network nodes can provide a service for user equipment.

In practice, user equipment selects, according to a network-side camping criterion, for example, according to transmitted and received signal quality of each network node, a cell of a network node for camping, and when having an uplink data transmission requirement, initiates random access and waits for the network node to allocate an uplink data transmission resource, to transmit uplink data. However, if the network node selected by the user equipment has relatively heavy load, a relatively long random access time or an access failure can be caused for the user equipment. That is, it takes a relatively long time for the user equipment to obtain the resource.

SUMMARY

Embodiments of the present disclosure disclose an uplink data transmission resource obtaining method and apparatus.

A first aspect of the present disclosure discloses an apparatus for transmitting data. The apparatus may include a processor, a memory storing a set of program code that is executable by the processor, and a communications interface, where the processor is configured to determine at least one first network node that provides an uplink data transmission resource; the communications interface is configured to send a resource obtaining request to each first network node, and receive a resource obtaining response that is sent by the first network node in response to the resource obtaining request received by the first network node, where the resource obtaining request is used to obtain an uplink data transmission resource; the processor is configured to select one of the at least one first network node as a serving network node according to the resource obtaining response, and determine the uplink data transmission resource that is provided by the serving network node for the apparatus; and the communications interface is further configured to send uplink data to the serving network node by using the uplink data transmission resource provided by the serving network node.

A second aspect of the present disclosure discloses an apparatus. The apparatus may include a processor, a memory storing a set of program code that is executable by the processor, and a communications interface, where the processor is configured to: receive, by using the communications interface, a resource obtaining request sent by user equipment, wherein the resource obtaining request is used to obtain an uplink data transmission resource; and send a resource obtaining response to the user equipment in response to the resource obtaining request by using the communications interface.

A third aspect of the present disclosure discloses a method for transmitting data. The method may include determining a first network node that provides an uplink data transmission resource; sending, by user equipment, a resource obtaining request to the first network node, and receiving a resource obtaining response that is returned by the first network node in responses to the resource obtaining request, wherein the resource obtaining request is used to obtain the uplink data transmission resource used to transmit uplink data; determining, by the user equipment according to the received resource obtaining response, a serving network node that provides the uplink data transmission resource for the user equipment, and determining the uplink data transmission resource that is provided by the serving network node for the user equipment; and sending, by the user equipment, uplink data by using the uplink data transmission resource provided by the serving network node.

It is to be understood that both the foregoing general description and the following detailed description are exemplary and explanatory only and are not restrictive of the present disclosure.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosures disclose an uplink data transmission resource obtaining method and system, and a device, so that user equipment accesses a serving network node selected by a first network node for the user equipment or accesses a serving network node selected by the user equipment from multiple first network nodes, to quickly and effectively obtain an uplink data transmission resource used to transmit uplink data. The following provides detailed descriptions separately.

Figure 1:
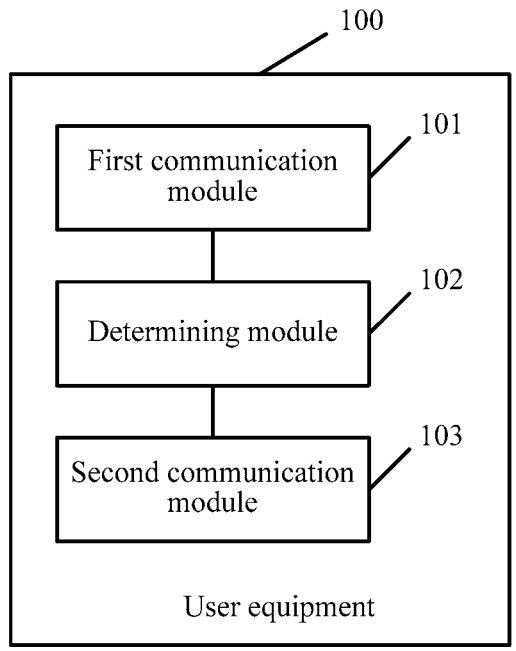
FIG. 1 is a schematic structural diagram of user equipment according to an aspect of the present disclosure.

Referring to FIG. 1, FIG. 1 is a schematic structural diagram of user equipment according to an aspect of the present disclosure. As shown in FIG. 1, the user equipment 100 may include: a first communication module 101, a determining module 102, and a second communication module 103.

The first communication module 101 is configured to: send a resource obtaining request to a first network node, and receive a resource obtaining response that is sent by the first network node for the resource obtaining request. The resource obtaining request is used to obtain an uplink data transmission resource, and the resource obtaining response includes node information of a serving network node that is determined by the first network node and that provides an uplink data transmission resource for the user equipment 100.

In this aspect of the present disclosure, when the user equipment 100 needs to send uplink data, the first communication module 101 sends the resource obtaining request to the first network node. The first network node may be a network node to which a cell on which the user equipment 100 camps belongs, or may be a network node to which a macro coverage cell in which the user equipment 100 is located belongs, or may be a network node having a context of or a signaling connection to the user equipment 100. Specifically, the first network node is a node having an air interface data transmission resource allocation function.

Optionally, the resource obtaining request may be sent in a random access phase of the user equipment 100. For example, the resource obtaining request is a random access preamble sent by the first communication module 101. Alternatively, the resource obtaining request may be sent in a data sending phase. For example, the resource obtaining request is radio resource control (RRC) signaling or an uplink user data packet sent by the first communication module 101.

In this aspect of the present disclosure, using an LTE system as an example, the resource obtaining response may be a media access control random access response (MAC RAR).

The determining module 102 is configured to: determine, according to the resource obtaining response, the serving network node that provides an uplink data transmission resource for the user equipment 100, and determine the uplink data transmission resource that is provided by the serving network node for the user equipment 100.

In this aspect of the present disclosure, the determining module 102 determines, according to the node information included in the resource obtaining response, the serving network node that provides an uplink data transmission resource for the user equipment 100. Alternatively, the determining module 102 determines a cell, which can provide an uplink data transmission resource for the user equipment 100, of the serving network node according to the node information.

In this aspect of the present disclosure, that the determining module 102 determines the uplink data transmission resource that is provided by the serving network node for the user equipment 100 may include: sending a random access request to the serving network node by using the first communication module 101, receiving, by using the first communication module 101, a random access response that is returned by the serving network node in response to the random access request, and determining a resource included in the random access response as the uplink data transmission resource that is provided by the serving network node for the user equipment 100.

A preamble used by the first communication module 101 to send the random access request may be a dedicated preamble given in the resource obtaining response, or may be any one selected by the user equipment 100 from available preambles of a cell. This is not limited in this aspect of the present disclosure.

The second communication module 103 is configured to send uplink data to the serving network node by using the uplink data transmission resource provided by the serving network node.

In an optional implementation, the resource obtaining request may include network node indication information. The network node indication information is used by the first network node to determine at least one second network node that can provide an uplink data transmission resource for the user equipment 100. The network node indication information may include: a node identifier of each second network node, or an identifier of a cell, which can provide an uplink data transmission resource for the user equipment 100, of each second network node, or location information of the user equipment 100. This is not limited in this aspect of the present disclosure.

In this optional implementation, the at least one second network node may be all second network nodes that are determined by the user equipment 100 and that can provide an uplink data transmission resource for the user equipment 100, or may be some second network nodes that are determined by the user equipment 100 from all second network nodes that can provide an uplink data transmission resource for the user equipment 100. This is not limited in this aspect of the present disclosure.

In this optional implementation, further optionally, when the at least one second network node is some second network nodes that are determined by the user equipment 100 from all second network nodes that can provide an uplink data transmission resource for the user equipment 100, the user equipment 100 may determine, according to measurement results of transmitted and received signal quality of all the second network nodes, each of the multiple second network nodes needing to be included in the network node indication information. Alternatively, the user equipment 100 may determine, according to service types supported by cells of all the second network nodes and signal quality measurement results, each of the multiple second network nodes needing to be included in the network node indication information. Alternatively, the service types may be device types.

Further optionally, when the resource obtaining request is sent in the random access phase of the user equipment 100, the user equipment 100 may indicate all the second network nodes to the first network node by using different access preambles or different access occasions. Alternatively, the user equipment 100 may indicate all the second network nodes to the first network node by sending, when sending an access preamble, a data packet including node information of all the second network nodes. This is not limited in this aspect of the present disclosure.

In an optional implementation, the resource obtaining response may further include a dedicated preamble of a corresponding cell of the serving network node and identification information allocated by the serving network node to the user equipment 100. Alternatively, the resource obtaining response may further include identification information allocated by the serving network node to the user equipment 100 and uplink grant information allocated by the serving network node to the user equipment 100. Alternatively, the resource obtaining response further includes identification information allocated by the serving network node to the user equipment 100, uplink grant information allocated by the serving network node to the user equipment 100, and synchronization information of the serving network node. This is not limited in this aspect of the present disclosure.

Further, the resource obtaining response may further include downlink channel configuration information. For example, the user equipment 100 receives channel information of downlink data.

In an optional implementation, when the resource obtaining response further includes the dedicated preamble of the cell of the serving network node, a specific manner of determining, by the determining module 102, the uplink data transmission resource that is provided by the serving network node for the user equipment 100 is:

sending, by using the first communication module 101, a random access request to the serving network node by using the dedicated preamble of the cell of the serving network node, receiving, by using the first communication module 101, a random access response that is returned by the serving network node in response to the random access request, and determining a resource included in the random access response as the uplink data transmission resource that is provided by the serving network node for the user equipment 100.

In an optional implementation, the user equipment 100 may further obtain, by using the first network node, configuration information of a cell of the at least one second network node, such as a random access channel (RACH), a physical downlink control channel (PDCCH), a physical uplink shared channel (PUSCH)/physical uplink control channel (PUCCH), or a physical hybrid automatic repeat indicator channel (PHICH) of the cell. The configuration information of the cell of the at least one second network node may be included in the resource obtaining response, or may be included in a system broadcast message of the cell of the at least one second network node or dedicated RRC signaling delivered by the first network node. In this way, the user equipment 100 does not need to obtain the configuration information from the second network node, reducing a latency of access by the user equipment 100 to the second network node, so that the user equipment 100 can obtain the uplink data transmission resource more quickly.

Optionally, the user equipment 100 may obtain the configuration information before or after sending the resource obtaining request. This is not limited in this aspect of the present disclosure.

It should be noted that, in this aspect of the present disclosure, receiving of the resource obtaining request and sending of the resource obtaining response are both described at a network node level. One network node may have multiple cells. The user equipment 100 usually sends an uplink data packet in a specific cell. Therefore, in this aspect of the present disclosure, all network nodes may be replaced with a cell, or a network node to which a cell belongs. That is, the user equipment 100 ultimately determines a serving network node or a serving cell. For example, the user equipment 100 ultimately determines a serving cell, and transmits the uplink data by using an uplink transmission resource obtained in the serving cell.

By means of this aspect of the present disclosure, the user equipment accesses a serving network node selected by a first network node for the user equipment, thereby quickly and effectively obtaining an uplink data transmission resource used to transmit uplink data.

Figure 2:
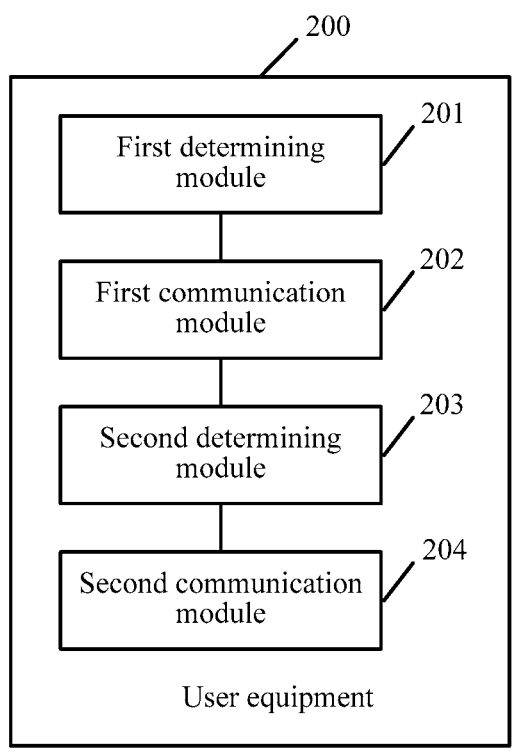
FIG. 2 is a schematic structural diagram of another user equipment according to an aspect of the present disclosure.

Referring to FIG. 2, FIG. 2 is a schematic structural diagram of another user equipment according to an aspect of the present disclosure. As shown in FIG. 2, the user equipment 200 may include: a first determining module 201, a first communication module 202, a second determining module 203, and a second communication module 204.

The first determining module 201 is configured to determine at least one first network node that can provide an uplink data transmission resource.

In this aspect of the present disclosure, the at least one first network node determined by the first determining module 201 may be all first network nodes that can provide an uplink data transmission resource for the user equipment 200, or may be some first network nodes that are determined by the user equipment 200 from all first network nodes that can provide an uplink data transmission resource for the user equipment 200. This is not limited in this aspect of the present disclosure.

Optionally, when the at least one first network node determined by the first determining module 201 is some first network nodes that are determined by the user equipment 200 from all first network nodes that can provide an uplink data transmission resource for the user equipment 200, the first determining module 201 may determine the at least one first network node according to measurement results of transmitted and received signal quality of all the first network nodes, or according to service types supported by cells of all the first network nodes and signal quality measurement results. This is not limited in this aspect of the present disclosure.

The first communication module 202 is configured to: send a resource obtaining request to each first network node, and receive a resource obtaining response that is sent by each first network node for the resource obtaining request received by the first network node.

In this aspect of the present disclosure, the resource obtaining request is used to obtain an uplink data transmission resource, and the uplink data transmission resource is used by the user equipment 200 to transmit uplink data.

In this aspect of the present disclosure, the first communication module 202 may send a common resource obtaining request, or may send different resource obtaining requests to different first network nodes. This is not limited in this aspect of the present disclosure. In the foregoing two resource obtaining request sending manners, the resource obtaining request is sent for each first network node. Preferably, when the first communication module 202 performs an operation of sending different resource obtaining requests to different first network nodes, if the first determining module 201 determines that a first network node has multiple cells meeting a requirement, the first communication module 202 may send different resource obtaining requests to different cells of the first network node. In this case, resource obtaining requests are all separately sent in corresponding cells meeting a requirement. For example, the first communication module 202 sends the resource obtaining requests to the cells by using time-frequency resources defined by the cells.

Optionally, at least one resource obtaining response received by the first communication module 202 may include resource selection indication information. The resource selection indication information is used to indicate an extent to which a corresponding first network node can accept the resource obtaining request of the user equipment 200. Each resource selection indication information may include: uplink grant information allocated by a corresponding first network node to the user equipment 200; or a resource use status of a cell of a corresponding first network node (for example, one or more of load information of a cell, receiving the resource obtaining request sent by the first communication module 202, of a corresponding first network node, an idle uplink data transmission resource of the cell, or a usage of an uplink data transmission resource of the cell); or service indication information of a corresponding first network node.

In this aspect of the present disclosure, using an LTE system as an example, the resource obtaining response may carry the resource selection indication information by using a media access control random access response (MAC RAR), or the resource obtaining response may use channel state information (CSI) of a current PDCCH to indicate cell load information indicated by the resource selection indication information. For example, the CSI being 1 indicates heavy cell load, and the CSI being 0 indicates light cell load.

Optionally, the first communication module 202 cannot receive resource obtaining responses sent by all the first network nodes receiving the resource obtaining request, that is, some first network nodes receiving the resource obtaining request may not send any response message to the user equipment 200, or send a resource obtaining rejection response to the user equipment 200.

The second determining module 203 is configured to: select a first network node as a serving network node according to the at least one resource obtaining response, and determine an uplink data transmission resource that is provided by the serving network node for the user equipment 200.

For example, after the first communication module 202 receives multiple resource obtaining responses including resource selection indication information, when the resource selection indication information is uplink grant information, the second determining module 203 may determine a first network node whose uplink grant information meets a threshold as the serving network node, or determine a first network node whose uplink grant information is maximum as the serving network node. When the resource selection indication information is a cell resource use status, the second determining module 203 may select a first network node corresponding to a cell that has lighter load and/or more idle uplink data transmission resources and/or an uplink data transmission resource with a lower usage as the serving network node.

Optionally, when selecting the serving network node, the second determining module 203 may further consider signal quality of a corresponding cell of a first network node sending a resource obtaining response. Preferably, when the second determining module 203 determines, according to the resource selection indication information, more than one first network node to be selected by the second determining module 203, the second determining module 203 may select, from the more than one first network node, a first network node whose signal quality is the best as the serving network node.

It should be noted that, in this aspect of the present disclosure, receiving of the resource obtaining request and sending of the resource obtaining response are both described at a network node level. Usually, one network node may have multiple cells. The user equipment 200 usually sends an uplink data packet in a specific cell. Therefore, in this aspect of the present disclosure, all network nodes may be replaced with a cell, or a network node to which a cell belongs. That is, the second determining module 203 of the user equipment 200 ultimately determines a serving network node or a serving cell. For example, the second determining module 203 ultimately determines a serving cell, and the second communication module 204 transmits the uplink data by using an uplink transmission resource obtained in the serving cell.

The second communication module 204 is configured to send the uplink data to the serving network node by using the uplink data transmission resource provided by the serving network node.

As can be seen, by means of this aspect of the present disclosure, the user equipment accesses a network node that is selected from multiple network nodes and that has lighter load and/or more idle uplink data transmission resources and/or an uplink data transmission resource with a lower usage, thereby quickly and effectively obtaining an uplink data transmission resource used to transmit uplink data.

Figure 3:
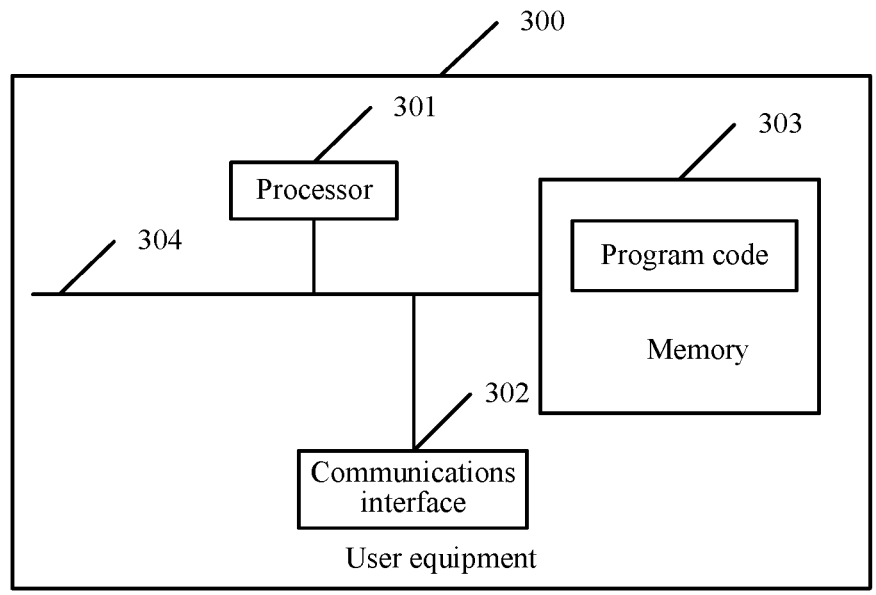
FIG. 3 is a schematic structural diagram of still another user equipment according to an aspect of the present disclosure.

Referring to FIG. 3, FIG. 3 is a schematic structural diagram of still another user equipment according to an aspect of the present disclosure. As shown in FIG. 3, the user equipment 300 may include: at least one processor 301, for example, a CPU, a communications interface 302, a memory 303, and at least one communications bus 304. The memory 303 may be a high speed RAM memory, or may be a non-volatile memory, such as at least one magnetic disk memory. Optionally, the memory 303 may alternatively be at least one storage apparatus located far away from the processor 301.

The communications bus 304 is configured to implement connection and communication between the components.

The communications interface 302 is configured to: send a resource obtaining request to a first network node, and receive a resource obtaining response that is sent by the first network node for the resource obtaining request. The resource obtaining request is used to obtain an uplink data transmission resource, and the resource obtaining response includes node information of a serving network node.

The memory 303 stores a set of program code, and the processor 301 is configured to invoke the program code stored in the memory 303, to perform the following operation:

determining, according to the resource obtaining response, the serving network node that provides an uplink data transmission resource for the user equipment 300, and determining the uplink data transmission resource that is provided by the serving network node for the user equipment 300.

The communications interface 302 is further configured to send uplink data to the serving network node by using the uplink data transmission resource provided by the serving network node.

In an optional aspect, the resource obtaining request includes network node indication information, the network node indication information is used by the first network node to determine at least one second network node that can provide an uplink data transmission resource for the user equipment 300, and the at least one second network node includes the serving network node; and the network node indication information may include: a node identifier of each second network node, or an identifier of a cell, which can provide an uplink data transmission resource for the user equipment 300, of each second network node, or location information of the user equipment 300.

In another optional aspect, the resource obtaining response may further include a dedicated preamble of a cell of the serving network node and identification information allocated by the serving network node to the user equipment 300; or the resource obtaining response may further include identification information allocated by the serving network node to the user equipment 300 and uplink grant information allocated by the serving network node to the user equipment 300; or the resource obtaining response may further include identification information allocated by the serving network node to the user equipment 300, uplink grant information allocated by the serving network node to the user equipment 300, and synchronization information of the serving network node.

In still another optional aspect, when the resource obtaining response further includes the dedicated preamble, a specific manner of determining, by the processor 301, the uplink data transmission resource that is provided by the serving network node for the user equipment 300 may be:

sending, by using the communications interface 302, a random access request to the serving network node by using the dedicated preamble; and receiving, by using the communications interface 302, a random access response that is sent by the serving network node for the random access request, and determining an uplink data transmission resource included in the random access response as the uplink data transmission resource that is provided by the serving network node for the user equipment 300.

By means of this aspect of the present disclosure, the user equipment accesses a serving network node selected by a first network node for the user equipment, thereby quickly and effectively obtaining an uplink data transmission resource used to transmit uplink data.

Figure 4:
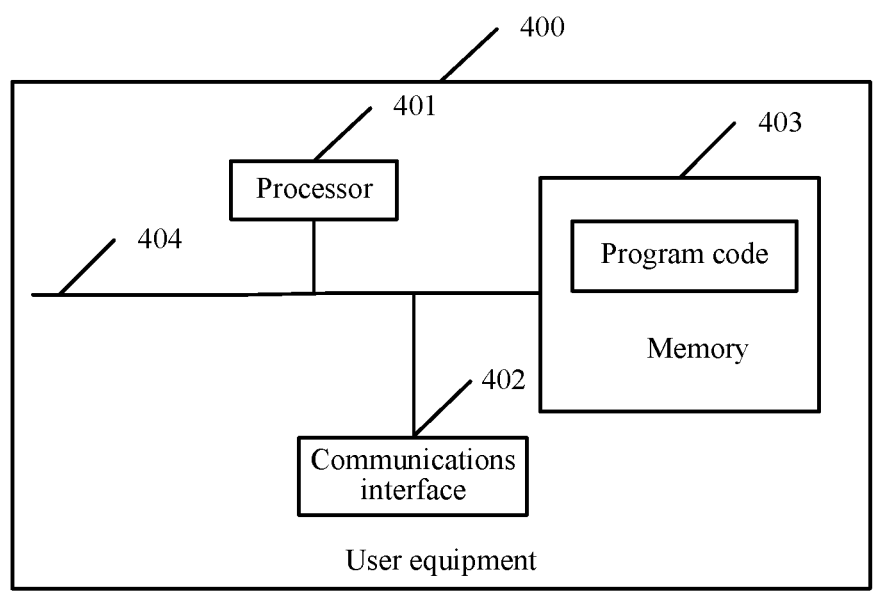
FIG. 4 is a schematic structural diagram of still another user equipment according to an aspect of the present disclosure.

Referring to FIG. 4, FIG. 4 is a schematic structural diagram of still another user equipment according to an aspect of the present disclosure. As shown in FIG. 4, the user equipment 400 may include: at least one processor 401, for example, a CPU, a communications interface 402, a memory 403, and at least one communications bus 404. The memory 403 may be a high speed RAM memory, or may be a non-volatile memory, such as at least one magnetic disk memory. Optionally, the memory 403 may alternatively be at least one storage apparatus located far away from the processor 401.

The communications bus 404 is configured to implement connection and communication between the components.

The memory 403 stores a set of program code, and the processor 401 is configured to invoke the program code stored in the memory 403, to perform the following operation:

determining at least one first network node that can provide an uplink data transmission resource.

The communications interface 402 is configured to: send a resource obtaining request to each first network node, and receive a resource obtaining response that is sent by each first network node for the resource obtaining request received by the first network node. The resource obtaining request is used to obtain an uplink data transmission resource.

Optionally, the communications interface 402 cannot receive resource obtaining responses sent by all the first network nodes receiving the resource obtaining request, that is, some first network nodes receiving the resource obtaining request may not send any response message to the user equipment 400, or send a resource obtaining rejection response to the user equipment 400.

The processor 401 may be configured to invoke the program code stored in the memory 403, to further perform the following operation:

selecting a first network node as a serving network node according to each resource obtaining response, and determining an uplink data transmission resource that is provided by the serving network node for the user equipment 400.

The communications interface 402 is further configured to send uplink data to the serving network node by using the uplink data transmission resource provided by the serving network node.

In an optional aspect, the resource obtaining response may include resource selection indication information, and the resource selection indication information is used to indicate an extent to which the first network node can accept the resource obtaining request of the user equipment 400. The resource selection indication information may include: uplink grant information allocated by the first network node to the user equipment 400, or load information of the first network node; or service indication information of the first network node.

In another optional aspect, a specific manner of determining, by the processor 401, at least one first network node that can provide an uplink data transmission resource may be:

determining, according to measurement results of transmitted and received signal quality of all the first network nodes or service types supported by cells of all the first network nodes, the at least one first network node that can provide an uplink data transmission resource, where all the first network nodes include all first network nodes that can provide an uplink data transmission resource for the user equipment 400.

As can be seen, by means of this aspect of the present disclosure, the user equipment accesses a network node selected from multiple network nodes, thereby quickly and effectively obtaining an uplink data transmission resource used to transmit uplink data.

Figure 5:
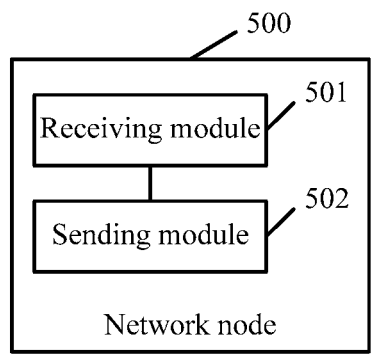
FIG. 5 is a schematic structural diagram of a network node according to an aspect of the present disclosure.

Referring to FIG. 5, FIG. 5 is a schematic structural diagram of a network node according to an aspect of the present disclosure. The network node shown in FIG. 5 may be a network node to which a cell on which user equipment camps belongs, or may be a network node to which a macro coverage cell in which user equipment is located belongs, or may be a network node having a context of or a signaling connection to user equipment. Specifically, the network node is a node having an air interface data transmission resource allocation function. As shown in FIG. 5, the network node 500 may include: a receiving module 501 and a sending module 502.

The receiving module 501 is configured to receive a first resource obtaining request sent by user equipment. The first resource obtaining request is used to obtain an uplink data transmission resource, and the uplink data transmission resource is used by the user equipment to transmit uplink data.

Optionally, the first resource obtaining request may be sent by the user equipment in a random access phase of the user equipment. For example, the first resource obtaining request is a random access preamble sent by the user equipment. Alternatively, the first resource obtaining request may be sent by the user equipment in a data sending phase. For example, the first resource obtaining request is RRC signaling or an uplink user data packet sent by the user equipment.

The sending module 502 is configured to send a first resource obtaining response to the user equipment in response to the first resource obtaining request. The first resource obtaining response may include node information of a serving network node that is determined by the network node 500 and that provides an uplink data transmission resource for the user equipment.

Figure 18:
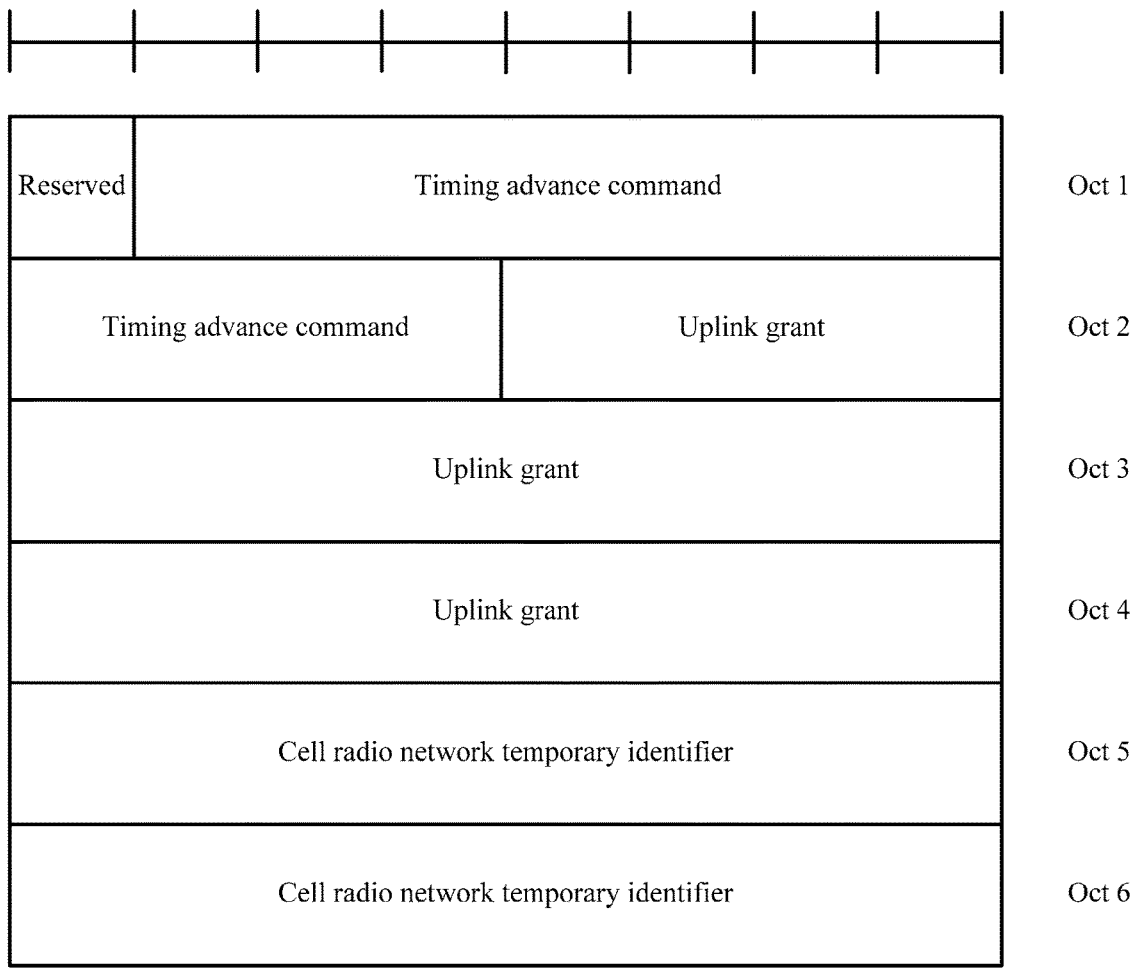
FIG. 18 is a schematic structural diagram of a MAC data packet according to an aspect of the present disclosure.

Using an LTE system as an example, specifically, the network node 500 may determine, according to resource use statuses of cells of the serving network node, a resource of which cell of the serving network node is allocated to the user equipment. Preferably, the sending module 502 of the network node 500 may send the first resource obtaining response to the user equipment by using a media access control (MAC) data packet of a downlink shared channel (DL-SCH). That is, the MAC data packet of the DL-SCH may carry an identifier of a cell selected by the network node 500 from the cells of the serving network node and resource information of the selected cell. A structure of the MAC data packet may be shown in FIG. 18. FIG. 18 is a schematic structural diagram of a MAC data packet according to an aspect of the present disclosure. The MAC data packet includes four fields: a reserved (R) field, a timing advance command field, an uplink scheduling grant (UL Grant) field, and a cell radio network temporary identifier field. The R field may be used to indicate that the MAC data packet is a data packet of resource information of the selected cell allocated to the user equipment.

In an optional implementation, the first resource obtaining request may include network node indication information. The network node indication information is used by the network node 500 to determine at least one second network node that can provide an uplink data transmission resource for the user equipment. The network node indication information may include: a node identifier of each second network node, or an identifier of a cell, which can provide an uplink data transmission resource for the user equipment, of each second network node, or location information of the user equipment. This is not limited in this aspect of the present disclosure.

In this optional implementation, the at least one second network node may be all second network nodes that are determined by the user equipment and that can provide an uplink data transmission resource for the user equipment, or may be some second network nodes that are determined by the user equipment from all second network nodes that can provide an uplink data transmission resource for the user equipment. This is not limited in this aspect of the present disclosure.

In this optional implementation, further optionally, when the first resource obtaining request is sent by the user equipment in the random access phase of the user equipment, the network node 500 may determine all the second network nodes by using different access preambles or different access occasions, or the network node 500 may determine all the second network nodes by using a data packet that is sent by the user equipment when the user equipment sends an access preamble and that includes node information of all the second network nodes. This is not limited in this aspect of the present disclosure.

In an optional implementation, a specific manner of sending, by the sending module 502, a first resource obtaining response to the user equipment in response to the first resource obtaining request may be:

determining the at least one second network node according to the network node indication information;

sending a second resource obtaining request to each second network node;

receiving, by using the receiving module 501, a second resource obtaining response that is sent by the at least one second network node for the second resource obtaining request received by the second network node, where each second resource obtaining response includes node information of a second network node sending the second resource obtaining response;

determining, according to each received second resource obtaining response, the serving network node that provides an uplink data transmission resource for the user equipment; and generating a first resource obtaining response according to a second resource obtaining response sent by the serving network node, and sending the first resource obtaining response to the user equipment.

Optionally, the sending module 502 cannot receive, by using the receiving module 501, second resource obtaining responses sent by all the second network nodes receiving the second resource obtaining request, that is, some second network nodes receiving the second resource obtaining request may not send any response message to the network node 500, or send a resource obtaining rejection response to the network node 500.

In this optional implementation, further optionally, the second resource obtaining response may further include a dedicated preamble of a corresponding cell of the second network node sending the second resource obtaining response and identification information allocated by the second network node to the user equipment, and the first resource obtaining response may further include a dedicated preamble of a corresponding cell of the serving network node and identification information allocated by the serving network node to the user equipment. Alternatively, the second resource obtaining response may further include identification information allocated to the user equipment by the second network node sending the second resource obtaining response and uplink grant information allocated by the second network node to the user equipment, and the first resource obtaining response may further include identification information allocated by the serving network node to the user equipment and uplink grant information allocated by the serving network node to the user equipment. Alternatively, the second resource obtaining response may further include identification information allocated to the user equipment by the second network node sending the second resource obtaining response, uplink grant information allocated by the second network node to the user equipment, and synchronization information of the second network node, and the first resource obtaining response may further include identification information allocated by the serving network node to the user equipment, uplink grant information allocated by the serving network node to the user equipment, and synchronization information of the serving network node.

In another optional implementation, a specific manner of sending, by the sending module 502, a first resource obtaining response to the user equipment in response to the first resource obtaining request may be:

determining the at least one second network node according to the network node indication information;

determining, according to pre-stored resource information of each second network node, the serving network node that provides an uplink data transmission resource for the user equipment; and generating a first resource obtaining response according to resource information of the serving network node, and sending the first resource obtaining response to the user equipment.

In this optional implementation, the network node 500 pre-stores the resource information of each second network node. When the receiving module 501 receives the resource obtaining request sent by the user equipment, the network node 500 allocates the pre-stored resource information to the user equipment. Optionally, when resource information of a second network node stored in the network node 500 is lower than a threshold, the network node 500 requests, by using the sending module 502, the second network node to allocate new resource information, and a specific manner of requesting, by the sending module 502, new resource information from the second network node may be:

sending a resource information obtaining request to the second network node, receiving, by using the receiving module 501, a resource information obtaining response that is sent by the second network node for the resource information obtaining request, where the resource information obtaining response includes resource information of the second network node.

Optionally, the network node 500 may further indicate, to the second network node, resource information of which cells needs to be obtained.

Specifically, the resource information may include: a dedicated preamble of the second network node and identification information allocated by the second network node; or identification information allocated by the second network node and uplink grant information allocated by the second network node; or identification information allocated by the second network node, uplink grant information allocated by the second network node, and synchronization information of the second network node. Optionally, the second network node may specify the resource information is specifically used in which cell of the second network node.

In this optional implementation, after the serving network node determines that a resource allocated by the network node 500 to the user equipment is released, the receiving module 501 may be further configured to receive a resource release indication information sent by the serving network node. The resource release indication information is used to indicate that the resource allocated by the network node 500 to the user equipment is released. In this way, the network node 500 can allocate the released resource to another user equipment.

In this optional implementation, further optionally, in addition to the node information of the serving network node, the first resource obtaining response sent by the sending module 502 to the user equipment may further include: a dedicated preamble of a corresponding cell of the serving network node and identification information allocated by the serving network node to the user equipment; or identification information allocated by the serving network node to the user equipment and uplink grant information allocated by the serving network node to the user equipment; or identification information allocated by the serving network node to the user equipment, uplink grant information allocated by the serving network node to the user equipment, and synchronization information of the serving network node.

Further, the first resource obtaining response may further include downlink channel configuration information. For example, the user equipment receives channel information of downlink data.

In an optional implementation, the sending module 502 may be further configured to send, to the user equipment, configuration information of a cell of the at least one second network node, such as a random access channel (RACH), a physical downlink control channel (PDCCH), a physical uplink shared channel (PUSCH)/physical uplink control channel (PUCCH), or a physical hybrid automatic repeat indicator channel (PHICH) of the cell. The configuration information of the cell of the at least one second network node may be included in the first resource obtaining response, or may be included in a system broadcast message of the cell of the at least one second network node or dedicated RRC signaling delivered by the at least one second network node. In this way, the user equipment does not need to obtain the configuration information from the second network node, reducing a latency of access by the user equipment to the second network node, so that the user equipment can obtain the uplink data transmission resource more quickly.

Optionally, the sending module 502 may send the configuration information to the user equipment before or after the receiving module 501 receives the first resource obtaining request sent by the user equipment. This is not limited in this aspect of the present disclosure.

In this aspect of the present disclosure, the network node can return, to user equipment according to a resource obtaining request sent by the user equipment, a resource obtaining response including node information of a serving network node that is determined by the network node and that provides an uplink data transmission resource for the user equipment, so that the user equipment accesses the serving network node, thereby quickly and effectively obtaining an uplink data transmission resource.

Figure 6:
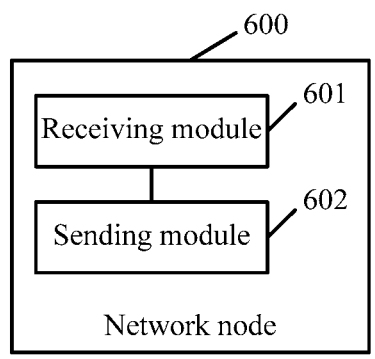
FIG. 6 is a schematic structural diagram of another network node according to an aspect of the present disclosure.

Referring to FIG. 6, FIG. 6 is a schematic structural diagram of another network node according to an aspect of the present disclosure. The network node shown in FIG. 6 may be one of all network nodes that can provide an uplink data transmission resource for user equipment, or may be one of some network nodes that can provide an uplink data transmission resource for user equipment. This is not limited in this aspect of the present disclosure. As shown in FIG. 6, the network node 600 may include: a receiving module 601 and a sending module 602.

The receiving module 601 is configured to receive a resource obtaining request sent by user equipment. The resource obtaining request is used to obtain an uplink data transmission resource, and the uplink data transmission resource is used by the user equipment to transmit uplink data.

Optionally, the resource obtaining request may be sent by the user equipment in a random access phase.

The sending module 602 is configured to send a resource obtaining response to the user equipment in response to the resource obtaining request.

In this aspect of the present disclosure, specifically, the sending module 602 is configured to: when the network node 600 has an idle uplink data transmission resource, send a resource obtaining response to the user equipment in response to the resource obtaining request. When the network node 600 does not have an idle uplink data transmission resource, the sending module 602 may not send any response message to the user equipment, or send a resource obtaining rejection response to the user equipment.

Optionally, the resource obtaining response may include resource selection indication information, and the resource selection indication information is used to indicate an extent to which the network node 600 can accept the resource obtaining request of the user equipment. The resource selection indication information may include: uplink grant information allocated by the network node 600 to the user equipment; or a resource use status of a cell of the network node 600 (for example, one or more of load information of a cell of the network node 600, an idle uplink data transmission resource of the cell, or a usage of an uplink data transmission resource of the cell); or service indication information of the network node 600.

In this aspect of the present disclosure, the network node can return a resource obtaining response according to a resource obtaining request sent by user equipment, so that when receiving resource obtaining responses sent by multiple network nodes, the user equipment determines, from the multiple network nodes, a serving network node that provides an uplink data transmission resource for the user equipment, and accesses the serving network node, thereby quickly and effectively obtaining an uplink data transmission resource.

Figure 7:
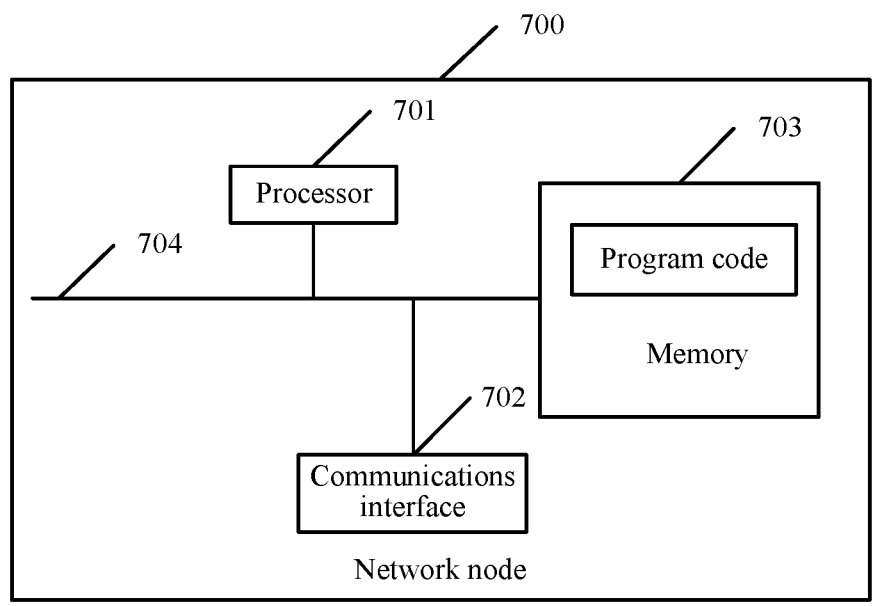
FIG. 7 is a schematic structural diagram of still another network node according to an aspect of the present disclosure.

Referring to FIG. 7, FIG. 7 is a schematic structural diagram of still another network node according to an aspect of the present disclosure. The network node shown in FIG. 7 may be a network node to which a cell on which user equipment camps belongs, or may be a network node to which a macro coverage cell in which user equipment is located belongs, or may be a network node having a context of or a signaling connection to user equipment. Specifically, the network node is a node having an air interface data transmission resource allocation function. As shown in FIG. 7, the network node 700 may include: at least one processor 701, for example, a CPU, a communications interface 702, a memory 703, and at least one communications bus 704. The memory 703 may be a high speed RAM memory, or may be a non-volatile memory, such as at least one magnetic disk memory. Optionally, the memory 703 may alternatively be at least one storage apparatus located far away from the processor 701.

The communications bus 704 is configured to implement connection and communication between the components.

The memory 701 stores a set of program code, and the processor 701 is configured to invoke the program code stored in the memory 703, to perform the following operations:

receiving, by using the communications interface 702, a first resource obtaining request sent by user equipment, where the first resource obtaining request is used to obtain an uplink data transmission resource; and sending a first resource obtaining response to the user equipment in response to the first resource obtaining request by using the communications interface 702, where the first resource obtaining response includes node information of a serving network node that is determined by the processor 701 of the network node 700 and that provides an uplink data transmission resource for the user equipment.

In an optional aspect, the first resource obtaining request includes network node indication information, the network node indication information is used by the processor 701 of the network node 700 to determine at least one second network node that can provide an uplink data transmission resource for the user equipment, and the at least one second network node includes the serving network node. The network node indication information includes: a node identifier of each second network node, or an identifier of a cell, which can provide an uplink data transmission resource for the user equipment, of each second network node, or location information of the user equipment.

In another optional implementation, a specific manner of sending, by the processor 701, a first resource obtaining response to the user equipment in response to the first resource obtaining request by using the communications interface 702 may be:

determining the at least one second network node according to the network node indication information;

sending a second resource obtaining request to each second network node by using the communications interface 702;

receiving, by using the communications interface 702, a second resource obtaining response that is sent by each second network node for the second resource obtaining request received by the second network node, where each second resource obtaining response includes node information of a second network node sending the second resource obtaining response;

determining, according to each second resource obtaining response, the serving network node that provides an uplink data transmission resource for the user equipment; and generating a first resource obtaining response according to a second resource obtaining response sent by the serving network node, and sending the first resource obtaining response to the user equipment by using the communications interface 702.

Optionally, the processor 701 cannot receive, by using the communications interface 702, second resource obtaining responses sent by all the second network nodes receiving the second resource obtaining request, that is, some second network nodes receiving the second resource obtaining request may not send any response message to the network node 700, or send a resource obtaining rejection response to the network node 700.

Further optionally, the second resource obtaining response may further include a dedicated preamble of a cell of the second network node sending the second resource obtaining response and identification information allocated by the second network node to the user equipment, and the first resource obtaining response may further include a dedicated preamble of a cell of the serving network node and identification information allocated by the serving network node to the user equipment; or each second resource obtaining response may further include identification information allocated to the user equipment by the second network node sending the second resource obtaining response and uplink grant information allocated by the second network node to the user equipment, and the first resource obtaining response may further include identification information allocated by the serving network node to the user equipment and uplink grant information allocated by the serving network node to the user equipment; or each second resource obtaining response may further include identification information allocated to the user equipment by the second network node sending the second resource obtaining response, uplink grant information allocated by the second network node to the user equipment, and synchronization information of the second network node, and the first resource obtaining response may further include identification information allocated by the serving network node to the user equipment, uplink grant information allocated by the serving network node to the user equipment, and synchronization information of the serving network node.

In still another optional aspect, a specific manner of sending, by the processor 701, a first resource obtaining response to the user equipment in response to the first resource obtaining request by using the communications interface 702 may be:

determining the at least one second network node according to the network node indication information;

determining, according to pre-stored resource information of each second network node, the serving network node that provides an uplink data transmission resource for the user equipment; and generating a first resource obtaining response according to resource information of the serving network node, and sending the first resource obtaining response to the user equipment by using the communications interface 702.

Optionally, the first resource obtaining response may further include a dedicated preamble of a cell of the serving network node and identification information allocated by the serving network node to the user equipment; or the first resource obtaining response may further include identification information allocated by the serving network node to the user equipment and uplink grant information allocated by the serving network node to the user equipment; or the first resource obtaining response may further include identification information allocated by the serving network node to the user equipment, uplink grant information allocated by the serving network node to the user equipment, and synchronization information of the serving network node.

In this aspect of the present disclosure, the network node can return, to user equipment according to a resource obtaining request sent by the user equipment, a resource obtaining response including node information of a serving network node that is determined by the network node and that provides an uplink data transmission resource for the user equipment, so that the user equipment accesses the serving network node, thereby quickly and effectively obtaining an uplink data transmission resource.

Figure 8:
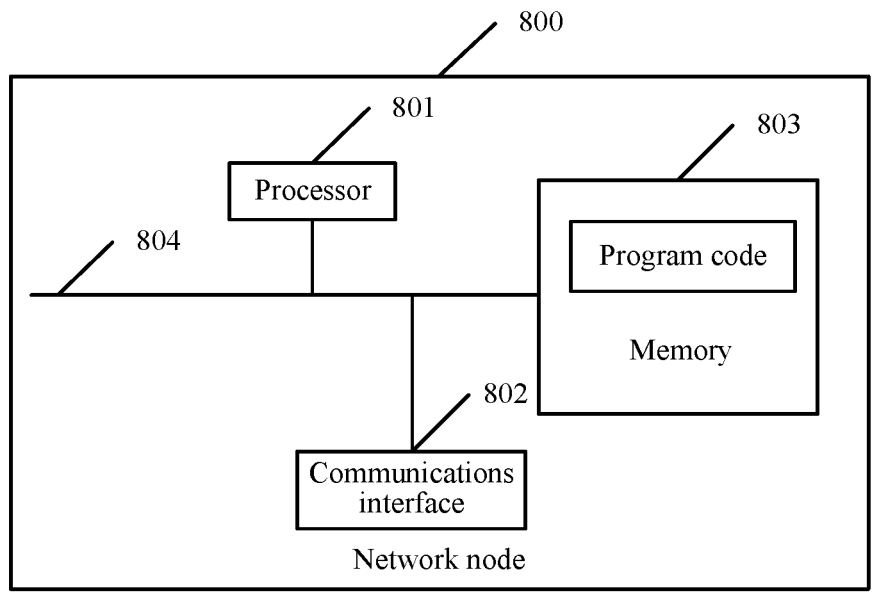
FIG. 8 is a schematic structural diagram of still another network node according to an aspect of the present disclosure.

Referring to FIG. 8, FIG. 8 is a schematic structural diagram of still another network node according to an aspect of the present disclosure. The network node shown in FIG. 8 may be one of all network nodes that can provide an uplink data transmission resource for user equipment, or may be one of some network nodes that can provide an uplink data transmission resource for user equipment. This is not limited in this aspect of the present disclosure. As shown in FIG. 8, the network node 800 may include: at least one processor 801, for example, a CPU, a communications interface 802, a memory 803, and at least one communications bus 804. The memory 803 may be a high speed RAM memory, or may be a non-volatile memory, such as at least one magnetic disk memory. Optionally, the memory 803 may alternatively be at least one storage apparatus located far away from the processor 801.

A resource obtaining request sent by user equipment is received by using the communications interface 802, where the resource obtaining request is used to obtain an uplink data transmission resource; and a resource obtaining response is sent to the user equipment in response to the resource obtaining request by using the communications interface 802.

Optionally, the resource obtaining response may include resource selection indication information, and the resource selection indication information is used to indicate an extent to which the network node 800 can accept the resource obtaining request of the user equipment. The resource selection indication information may include: uplink grant information allocated by the network node 800 to the user equipment; or a resource use status of a cell of the network node 800 (for example, one or more of load information of a cell of the network node 800, an idle uplink data transmission resource of the cell, or a usage of an uplink data transmission resource of the cell); or service indication information of the network node 800.

In this aspect of the present disclosure, the network node can return a resource obtaining response according to a resource obtaining request sent by user equipment, so that when receiving resource obtaining responses sent by multiple network nodes, the user equipment determines, from the multiple network nodes, a serving network node that provides an uplink data transmission resource for the user equipment, and accesses the serving network node, thereby quickly and effectively obtaining an uplink data transmission resource.

Figure 9:
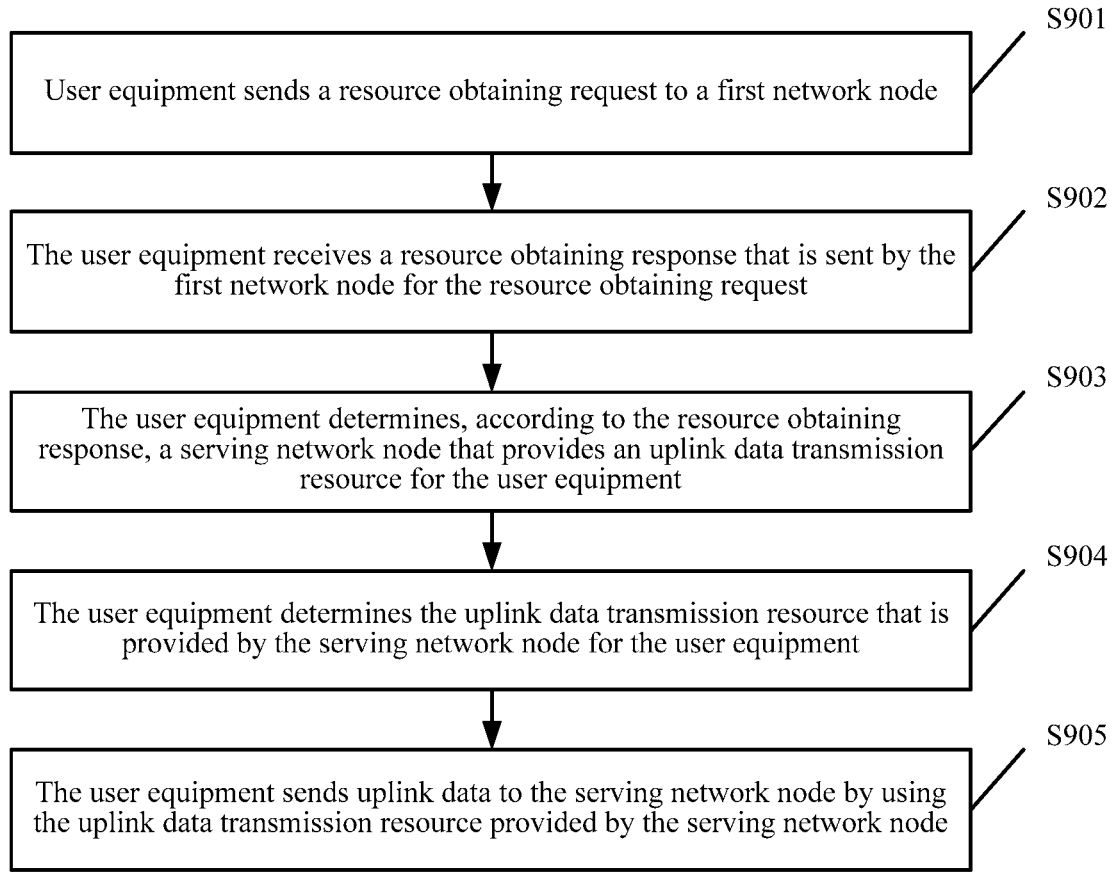
FIG. 9 is a schematic flowchart of an uplink data transmission resource obtaining method according to an aspect of the present disclosure.

Referring to FIG. 9, FIG. 9 is a schematic flowchart of an uplink data transmission resource obtaining method according to an aspect of the present disclosure. As shown in FIG. 9.

S901: User equipment sends a resource obtaining request to a first network node.

In this aspect of the present disclosure, when needing to send uplink data, the user equipment sends the resource obtaining request to the first network node. The first network node may be a network node to which a cell on which the user equipment camps belongs, or may be a network node to which a macro coverage cell in which the user equipment is located belongs, or may be a network node having a context of or a signaling connection to the user equipment. Specifically, the first network node is a node having an air interface data transmission resource allocation function. Using a long term evolution (LTE) system as an example, the first network node may be an evolved NodeB eNB, a core network node (for example, a mobility management entity (MME) or a packet data network gateway (P-GW)), or the like. This is not limited in this aspect of the present disclosure. The resource obtaining request is used to obtain an uplink data transmission resource, and the uplink data transmission resource is used by the user equipment to transmit the uplink data.

Optionally, the resource obtaining request may be sent in a random access phase of the user equipment. For example, the resource obtaining request is a random access preamble sent by the user equipment. Alternatively, the resource obtaining request may be sent in a data sending phase. For example, the resource obtaining request is radio resource control (RRC) signaling or an uplink user data packet sent by the user equipment.

S902: The user equipment receives a resource obtaining response that is sent by the first network node for the resource obtaining request.

In this aspect of the present disclosure, the resource obtaining response may include node information of a serving network node that is determined by the first network node and that can provide an uplink data transmission resource for the user equipment.

In this aspect of the present disclosure, using the LTE system as an example, the resource obtaining response may be a media access control random access response (MAC RAR).

S903: The user equipment determines, according to the resource obtaining response, a serving network node that provides an uplink data transmission resource for the user equipment.

In this aspect of the present disclosure, the user equipment determines, according to the node information included in the resource obtaining response, the serving network node that provides an uplink data transmission resource for the user equipment, or the user equipment determines a cell, which can provide an uplink data transmission resource for the user equipment, of the serving network node according to the node information.

S904: The user equipment determines the uplink data transmission resource that is provided by the serving network node for the user equipment.

In this aspect of the present disclosure, that the user equipment determines the uplink data transmission resource that is provided by the serving network node for the user equipment may include: The user equipment sends a random access request to the serving network node, receives a random access response that is returned by the serving network node in response to the random access request, and determines a resource included in the random access response as the uplink data transmission resource that is provided by the serving network node for the user equipment.

A preamble used by the user equipment to send the random access request may be a dedicated preamble given in the resource obtaining response, or may be any one selected by the user equipment from available preambles of a cell. This is not limited in this aspect of the present disclosure.

S905: The user equipment sends uplink data to the serving network node by using the uplink data transmission resource provided by the serving network node.

In an optional implementation, the resource obtaining request may include network node indication information. The network node indication information is used by the first network node to determine at least one second network node that can provide an uplink data transmission resource for the user equipment. The network node indication information may include: a node identifier of each second network node, or an identifier of a cell, which can provide an uplink data transmission resource for the user equipment, of each second network node, or location information of the user equipment. This is not limited in this aspect of the present disclosure.

In this optional implementation, the at least one second network node may be all second network nodes that are determined by the user equipment and that can provide an uplink data transmission resource for the user equipment, or may be some second network nodes that are determined by the user equipment from all second network nodes that can provide an uplink data transmission resource for the user equipment. This is not limited in this aspect of the present disclosure.

In this optional implementation, further optionally, when the at least one second network node is some second network nodes that are determined by the user equipment from all second network nodes that can provide an uplink data transmission resource for the user equipment, the user equipment may determine, according to measurement results of transmitted and received signal quality of all the second network nodes, each of the multiple second network nodes needing to be included in the network node indication information. Alternatively, the user equipment may determine, according to service types supported by cells of all the second network nodes and signal quality measurement results, each of the multiple second network nodes needing to be included in the network node indication information. Alternatively, the service types may be device types.

Further optionally, when the resource obtaining request is sent in the random access phase of the user equipment, the user equipment may indicate all the second network nodes to the first network node by using different access preambles or different access occasions. Alternatively, the user equipment may indicate all the second network nodes to the first network node by sending, when sending an access preamble, a data packet including node information of all the second network nodes. This is not limited in this aspect of the present disclosure.

In an optional implementation, the resource obtaining response may further include a dedicated preamble of a corresponding cell of the serving network node and identification information allocated by the serving network node to the user equipment. Alternatively, the resource obtaining response may further include identification information allocated by the serving network node to the user equipment and uplink grant information allocated by the serving network node to the user equipment. Alternatively, the resource obtaining response further includes identification information allocated by the serving network node to the user equipment, uplink grant information allocated by the serving network node to the user equipment, and synchronization information of the serving network node. This is not limited in this aspect of the present disclosure.

Further, the resource obtaining response may further include downlink channel configuration information. For example, the user equipment receives channel information of downlink data.

In an optional implementation, when the resource obtaining response further includes the dedicated preamble of the cell of the serving network node, a specific manner of determining, by the user equipment, the uplink data transmission resource that is provided by the serving network node for the user equipment may include:

sending, by the user equipment, a random access request to the serving network node by using the dedicated preamble of the cell of the serving network node, receiving a random access response that is returned by the serving network node in response to the random access request, and determining a resource included in the random access response as the uplink data transmission resource that is provided by the serving network node for the user equipment.

In an optional implementation, the user equipment may further obtain, by using the first network node, configuration information of a cell of the at least one second network node, such as a random access channel (RACH), a physical downlink control channel (PDCCH), a physical uplink shared channel (PUSCH)/physical uplink control channel (PUCCH), or a physical hybrid automatic repeat indicator channel (PHICH) of the cell. The configuration information of the cell of the at least one second network node may be included in the resource obtaining response, or may be included in a system broadcast message of the cell of the at least one second network node or dedicated RRC signaling delivered by the first network node. In this way, the user equipment does not need to obtain the configuration information from the second network node, reducing a latency of access by the user equipment to the second network node, so that the user equipment can obtain the uplink data transmission resource more quickly.

Optionally, the user equipment may obtain the configuration information before or after sending the resource obtaining request. This is not limited in this aspect of the present disclosure.

It should be noted that, in this aspect of the present disclosure, receiving of the resource obtaining request and sending of the resource obtaining response are both described at a network node level. One network node may have multiple cells. The user equipment usually sends an uplink data packet in a specific cell. Therefore, in this aspect of the present disclosure, all network nodes may be replaced with a cell, or a network node to which a cell belongs. That is, the user equipment ultimately determines a serving network node or a serving cell. For example, the user equipment ultimately determines a serving cell, and transmits the uplink data by using an uplink transmission resource obtained in the serving cell.

In this aspect of the present disclosure, user equipment sends a resource obtaining request to a first network node, and receives a resource obtaining response that is returned by the first network node for the resource obtaining request. The resource obtaining request is used to obtain an uplink data transmission resource used to transmit uplink data. The user equipment determines, according to the received resource obtaining response, a serving network node that provides an uplink data transmission resource for the user equipment, and determines the uplink data transmission resource that is provided by the serving network node for the user equipment. The user equipment sends uplink data by using the uplink data transmission resource provided by the serving network node. By means of this aspect of the present disclosure, the user equipment accesses the serving network node selected by the first network node for the user equipment, thereby quickly and effectively obtaining the uplink data transmission resource used to transmit the uplink data.

Figure 10:
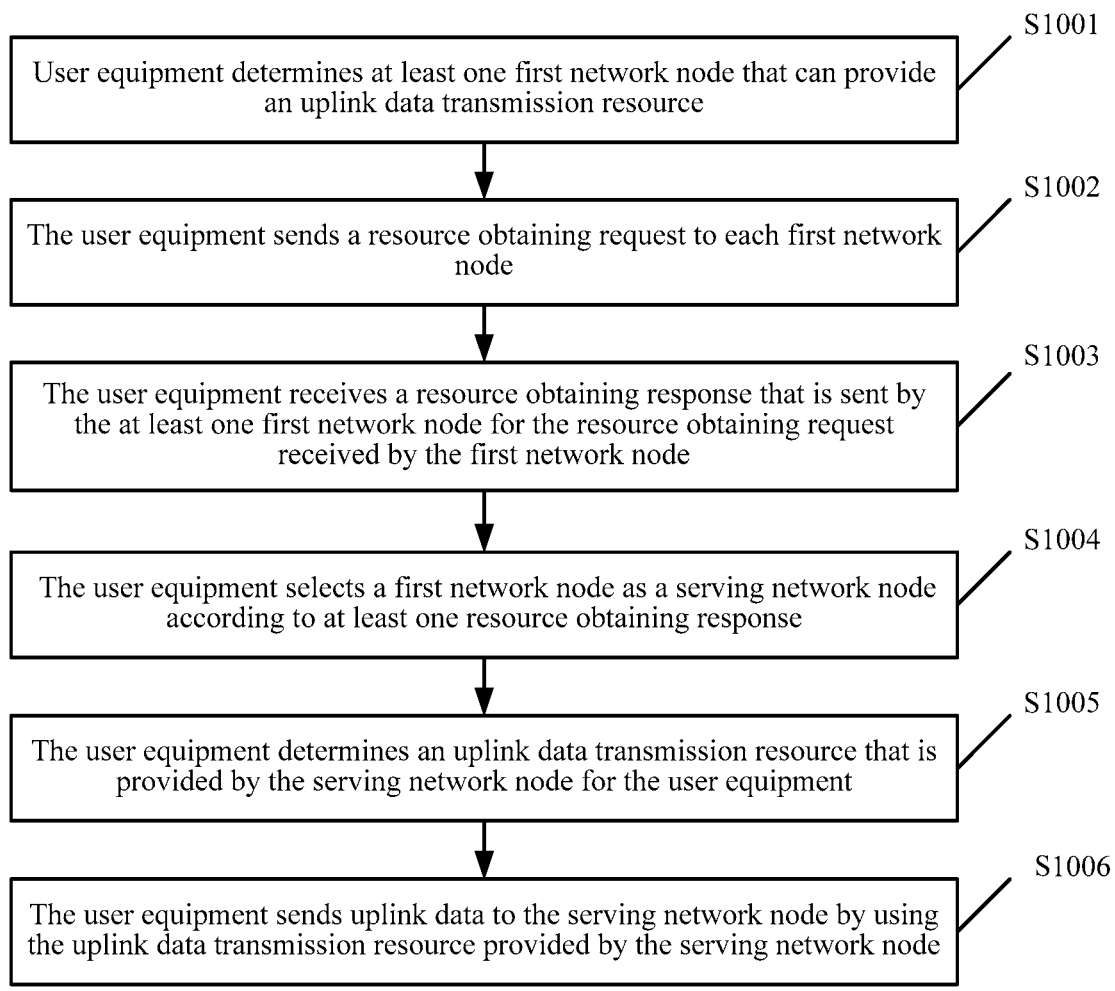
FIG. 10 is a schematic flowchart of another uplink data transmission resource obtaining method according to an aspect of the present disclosure.

Referring to FIG. 10, FIG. 10 is a schematic flowchart of another uplink data transmission resource obtaining method according to an aspect of the present disclosure.

S1001: User equipment determines at least one first network node that can provide an uplink data transmission resource.

In this aspect of the present disclosure, the at least one first network node determined by the user equipment may be all first network nodes that can provide an uplink data transmission resource for the user equipment, or may be some first network nodes that are determined by the user equipment from all first network nodes that can provide an uplink data transmission resource for the user equipment. This is not limited in this aspect of the present disclosure.

Optionally, when the at least one first network node determined by the user equipment is some first network nodes that are determined by the user equipment from all first network nodes that can provide an uplink data transmission resource for the user equipment, the user equipment may determine the at least one first network node according to measurement results of transmitted and received signal quality of all the first network nodes, or according to service types supported by cells of all the first network nodes and signal quality measurement results. This is not limited in this aspect of the present disclosure.

S1002: The user equipment sends a resource obtaining request to each first network node.

In this aspect of the present disclosure, the resource obtaining request is used to obtain an uplink data transmission resource, and the uplink data transmission resource is used by the user equipment to transmit uplink data.

In this aspect of the present disclosure, the user equipment may send a common resource obtaining request, or may send different resource obtaining requests to different first network nodes. This is not limited in this aspect of the present disclosure. In the foregoing two resource obtaining request sending manners, the resource obtaining request is sent for each first network node. Preferably, when the user equipment performs an operation of sending different resource obtaining requests to different first network nodes, if the user equipment determines that a first network node has multiple cells meeting a requirement, the user equipment may send different resource obtaining requests to different cells of the first network node. In this case, resource obtaining requests are all separately sent in corresponding cells meeting a requirement. For example, the user equipment sends the resource obtaining requests to the cells by using time-frequency resources defined by the cells.

S1003: The user equipment receives a resource obtaining response that is sent by the at least one first network node for the resource obtaining request received by the first network node.

Optionally, at least one resource obtaining response received by the user equipment may include resource selection indication information. The resource selection indication information is used to indicate an extent to which a corresponding first network node can accept the resource obtaining request of the user equipment. Each resource selection indication information may include: uplink grant information allocated by a corresponding first network node to the user equipment; or a resource use status of a cell of a corresponding first network node (for example, one or more of load information of a cell, receiving the resource obtaining request sent by the user equipment, of a corresponding first network node, an idle uplink data transmission resource of the cell, or a usage of an uplink data transmission resource of the cell); or service indication information of a corresponding first network node.

In this aspect of the present disclosure, using an LTE system as an example, the resource obtaining response may carry the resource selection indication information by using a media access control random access response (MAC RAR), or the resource obtaining response may use channel state information (CSI) of a current PDCCH to indicate cell load information indicated by the resource selection indication information. For example, the CSI being 1 indicates heavy cell load, and the CSI being 0 indicates light cell load.

Optionally, the user equipment cannot receive resource obtaining responses sent by all the first network nodes receiving the resource obtaining request, that is, some first network nodes receiving the resource obtaining request may not send any response message to the user equipment, or send a resource obtaining rejection response to the user equipment.

S1004: The user equipment selects a first network node as a serving network node according to at least one resource obtaining response.

For example, after the user equipment receives multiple resource obtaining responses including resource selection indication information, when the resource selection indication information is uplink grant information, the user equipment may determine a first network node whose uplink grant information meets a threshold as the serving network node, or determine a first network node whose uplink grant information is maximum as the serving network node. When the resource selection indication information is a cell resource use status, the user equipment may select a first network node corresponding to a cell that has lighter load and/or more idle uplink data transmission resources and/or an uplink data transmission resource with a lower usage as the serving network node.

Optionally, when selecting the serving network node, the user equipment may further consider signal quality of a corresponding cell of a first network node sending a resource obtaining response. Preferably, when the user equipment determines, according to the resource selection indication information, more than one first network node to be selected by the user equipment, the user equipment may select, from the more than one first network node, a first network node whose signal quality is the best as the serving network node.

It should be noted that, in this aspect of the present disclosure, receiving of the resource obtaining request and sending of the resource obtaining response are both described at a network node level. Usually, one network node may have multiple cells. The user equipment usually sends an uplink data packet in a specific cell. Therefore, in this aspect of the present disclosure, all network nodes may be replaced with a cell, or a network node to which a cell belongs. That is, the user equipment ultimately determines a serving network node or a serving cell. For example, the user equipment ultimately determines a serving cell, and transmits the uplink data by using an uplink transmission resource obtained in the serving cell.

S1005: The user equipment determines an uplink data transmission resource that is provided by the serving network node for the user equipment.

S1006: The user equipment sends uplink data to the serving network node by using the uplink data transmission resource provided by the serving network node.

In this aspect of the present disclosure, user equipment sends a resource obtaining request to each first network node that is determined by the user equipment and that can provide an uplink data transmission resource, receives a resource obtaining response returned by at least one first network node, determines, according to each resource obtaining response, a serving network node that has lighter load and/or more idle uplink data transmission resources and/or an uplink data transmission resource with a lower usage, and after determining an uplink data transmission resource provided by the serving network node, sends uplink data to the serving network node by using the uplink data transmission resource. As can be seen, by means of this aspect of the present disclosure, the user equipment accesses the network node that is selected from multiple network nodes and that has lighter load and/or more idle uplink data transmission resources and/or an uplink data transmission resource with a lower usage, thereby quickly and effectively obtaining the uplink data transmission resource used to transmit the uplink data.

Figure 11:
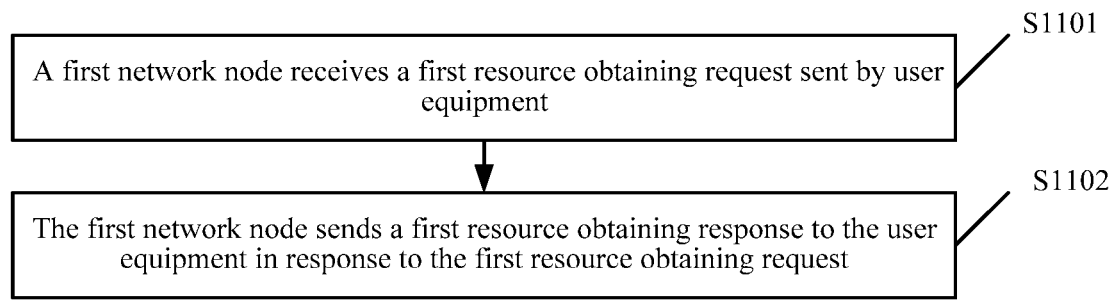
FIG. 11 is a schematic flowchart of still another uplink data transmission resource obtaining method according to an aspect of the present disclosure.

Referring to FIG. 11, FIG. 11 is a schematic flowchart of still another uplink data transmission resource obtaining method according to an aspect of the present disclosure. As shown in FIG. 11, the uplink data transmission resource obtaining method may include the following steps.

S1101: A first network node receives a first resource obtaining request sent by user equipment.

In this aspect of the present disclosure, the first resource obtaining request is used to obtain an uplink data transmission resource, and the uplink data transmission resource is used by the user equipment to transmit uplink data. The first network node may be a network node to which a cell on which user equipment camps belongs, or may be a network node to which a macro coverage cell in which user equipment is located belongs, or may be a network node having a context of or a signaling connection to user equipment. Specifically, the first network node is a node having an air interface data transmission resource allocation function. Using an LTE system as an example, the first network node may be an evolved NodeB eNB or a core network node (for example, a mobility management entity (MME) or a packet data network gateway (P-GW)) or the like. This is not limited in this aspect of the present disclosure.

Optionally, the first resource obtaining request may be sent by the user equipment in a random access phase of the user equipment. For example, the first resource obtaining request is a random access preamble sent by the user equipment. Alternatively, the first resource obtaining request may be sent by the user equipment in a data sending phase. For example, the first resource obtaining request is RRC signaling or an uplink user data packet sent by the user equipment.

S1102: The first network node sends a first resource obtaining response to the user equipment in response to the first resource obtaining request.

In this aspect of the present disclosure, the first resource obtaining response includes node information of a serving network node that is determined by the first network node and that can provide an uplink data transmission resource for the user equipment.

Using the LTE system as an example, specifically, the first network node may determine, according to resource use statuses of cells of the serving network node, a resource of which cell of the serving network node is allocated to the user equipment. Preferably, the first network node may send the first resource obtaining response to the user equipment by using a media access control (MAC) data packet of a downlink shared channel (DL-SCH). That is, the MAC data packet of the DL-SCH may carry an identifier of a cell selected by the first network node from the cells of the serving network node and resource information of the selected cell. A structure of the MAC data packet may be shown in FIG. 18. FIG. 18 is a schematic structural diagram of a MAC data packet according to an aspect of the present disclosure. The MAC data packet includes four fields: a reserved (R) field, a timing advance command field, an uplink scheduling grant (UL Grant) field, and a cell radio network temporary identifier field. The R field may be used to indicate that the MAC data packet is a data packet of resource information of the selected cell allocated to the user equipment.

In an optional implementation, the first resource obtaining request may include network node indication information. The network node indication information is used by the first network node to determine at least one second network node that can provide an uplink data transmission resource for the user equipment. The network node indication information may include: a node identifier of each second network node, or an identifier of a cell, which can provide an uplink data transmission resource for the user equipment, of each second network node, or location information of the user equipment. This is not limited in this aspect of the present disclosure.

In this optional implementation, the at least one second network node may be all second network nodes that are determined by the user equipment and that can provide an uplink data transmission resource for the user equipment, or may be some second network nodes that are determined by the user equipment from all second network nodes that can provide an uplink data transmission resource for the user equipment. This is not limited in this aspect of the present disclosure.

In this optional implementation, further optionally, when the first resource obtaining request is sent by the user equipment in the random access phase of the user equipment, the first network node may determine all the second network nodes by using different access preambles or different access occasions, or the first network node may determine all the second network nodes by using a data packet that is sent by the user equipment when the user equipment sends an access preamble and that includes node information of all the second network nodes. This is not limited in this aspect of the present disclosure.

In an optional implementation, a specific manner of sending, by the first network node, a first resource obtaining response to the user equipment in response to the first resource obtaining request may include:

determining, by the first network node, the at least one second network node according to the network node indication information;

sending, by the first network node, a second resource obtaining request to each second network node;

receiving, by the first network node, a second resource obtaining response that is sent by the at least one second network node for the second resource obtaining request received by the second network node, where each second resource obtaining response includes node information of a second network node sending the second resource obtaining response;

determining, by the first network node according to each received second resource obtaining response, the serving network node that provides an uplink data transmission resource for the user equipment; and generating, by the first network node, a first resource obtaining response according to a second resource obtaining response sent by the serving network node, and sending the first resource obtaining response to the user equipment.

Optionally, the first network node cannot receive second resource obtaining responses sent by all the second network nodes receiving the second resource obtaining request, that is, some second network nodes receiving the second resource obtaining request may not send any response message to the first network node, or send a resource obtaining rejection response to the first network node.

In this optional implementation, further optionally, the second resource obtaining response may further include a dedicated preamble of a corresponding cell of the second network node sending the second resource obtaining response and identification information allocated by the second network node to the user equipment, and the first resource obtaining response may further include a dedicated preamble of a corresponding cell of the serving network node and identification information allocated by the serving network node to the user equipment. Alternatively, each second resource obtaining response may further include identification information allocated to the user equipment by the second network node sending the second resource obtaining response and uplink grant information allocated by the second network node to the user equipment, and the first resource obtaining response may further include identification information allocated by the serving network node to the user equipment and uplink grant information allocated by the serving network node to the user equipment. Alternatively, each second resource obtaining response may further include identification information allocated to the user equipment by the second network node sending the second resource obtaining response, uplink grant information allocated by the second network node to the user equipment, and synchronization information of the second network node, and the first resource obtaining response may further include identification information allocated by the serving network node to the user equipment, uplink grant information allocated by the serving network node to the user equipment, and synchronization information of the serving network node.

In another optional implementation, a specific manner of sending, by the first network node, a first resource obtaining response to the user equipment in response to the first resource obtaining request may include:

determining, by the first network node, the at least one second network node according to the network node indication information;

determining, by the first network node according to pre-stored resource information of each second network node, the serving network node that provides an uplink data transmission resource for the user equipment; and generating, by the first network node, a first resource obtaining response according to resource information of the serving network node, and sending the first resource obtaining response to the user equipment.

Figure 17:
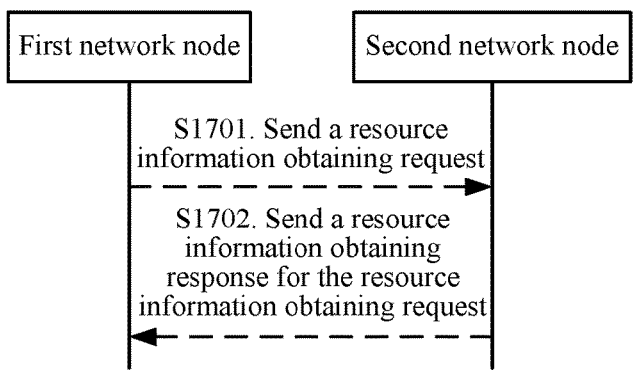
FIG. 17 is a schematic flowchart of a method for requesting new resource information from a second network node by a first network node according to an aspect of the present disclosure.

In this optional implementation, the first network node pre-stores the resource information of each second network node. When receiving the resource obtaining request sent by the user equipment, the first network node allocates the pre-stored resource information to the user equipment. Optionally, when resource information of a second network node stored in the first network nod is lower than a threshold, the first network nod requests the second network node to allocate new resource information. A procedure of requesting new resource information from the second network node by the first network node may be shown in FIG. 17. FIG. 17 is a schematic flowchart of a method for requesting new resource information from a second network node by a first network node according to an aspect of the present disclosure. As shown in FIG. 17, the method for requesting new resource information may include the following steps.

S1701: The first network node sends a resource information obtaining request to the second network node.

Optionally, the first network node may indicate, to the second network node, resource information of which cells needs to be obtained.

S1702: The second network node sends, to the first network node, a resource information obtaining response for the resource information obtaining request.

The resource information obtaining response includes resource information of the second network node.

Specifically, the resource information may include: a dedicated preamble of the second network node and identification information allocated by the second network node; or identification information allocated by the second network node and uplink grant information allocated by the second network node; or identification information allocated by the second network node, uplink grant information allocated by the second network node, and synchronization information of the second network node. Optionally, the second network node may specify the resource information is specifically used in which cell of the second network node.

It should be noted that, there is no necessary order between the procedure corresponding to FIG. 17 and the procedure corresponding to FIG. 11. That is, the procedure in FIG. 17 may be performed at any time, and is not affected by the procedure corresponding to FIG. 11.

In this optional implementation, after the serving network node determines that a resource allocated by the first network node to the user equipment is released, the first network node may further perform the following operation:

receiving a resource release indication information sent by the serving network node. The resource release indication information is used to indicate that the resource allocated by the first network node to the user equipment is released. In this way, the first network node can allocate the released resource to another user equipment.

In this optional implementation, further optionally, in addition to the node information of the serving network node, the first resource obtaining response sent by the first network node to the user equipment may further include: a dedicated preamble of a corresponding cell of the serving network node and identification information allocated by the serving network node to the user equipment; or identification information allocated by the serving network node to the user equipment and uplink grant information allocated by the serving network node to the user equipment; or identification information allocated by the serving network node to the user equipment, uplink grant information allocated by the serving network node to the user equipment, and synchronization information of the serving network node.

Further, the first resource obtaining response may further include downlink channel configuration information. For example, the user equipment receives channel information of downlink data.

In an optional implementation, the first network node may further send, to the user equipment, configuration information of a cell of the at least one second network node, such as a random access channel (RACH), a physical downlink control channel (PDCCH), a physical uplink shared channel (PUSCH)/physical uplink control channel (PUCCH), or a physical hybrid automatic repeat indicator channel (PHICH) of the cell. The configuration information of the cell of the at least one second network node may be included in the first resource obtaining response, or may be included in a system broadcast message of the cell of the at least one second network node or dedicated RRC signaling delivered by the at least one second network node. In this way, the user equipment does not need to obtain the configuration information from the second network node, reducing a latency of access by the user equipment to the second network node, so that the user equipment can obtain the uplink data transmission resource more quickly.

Optionally, the first network node may send the configuration information to the user equipment before or after receiving the first resource obtaining request sent by the user equipment. This is not limited in this aspect of the present disclosure.

In this aspect of the present disclosure, a first network node can return, to user equipment according to a resource obtaining request sent by the user equipment, a resource obtaining response including node information of a serving network node that is determined by the first network node and that provides an uplink data transmission resource for the user equipment, so that the user equipment accesses the serving network node, thereby quickly and effectively obtaining an uplink data transmission resource.

Figure 12:
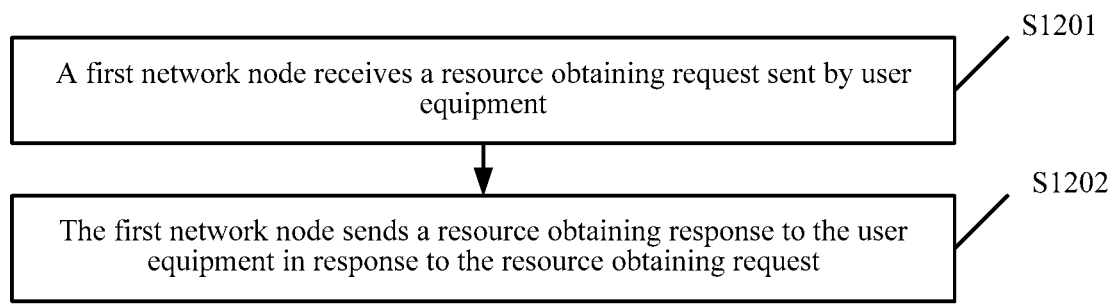
FIG. 12 is a schematic flowchart of still another uplink data transmission resource obtaining method according to an aspect of the present disclosure.

Referring to FIG. 12, FIG. 12 is a schematic flowchart of still another uplink data transmission resource obtaining method according to an aspect of the present disclosure. As shown in FIG. 12, the uplink data transmission resource obtaining method may include the following steps.

S1201: A first network node receives a resource obtaining request sent by user equipment.

In this aspect of the present disclosure, the resource obtaining request is used to obtain an uplink data transmission resource, and the uplink data transmission resource is used by the user equipment to transmit uplink data.

In this aspect of the present disclosure, after the resource obtaining request sent by the user equipment is received, when the first network node has an idle uplink data transmission resource, the first network node performs step S1202. When the first network node does not have an idle uplink data transmission resource, the first network node may not send any response message to the user equipment, or send a resource obtaining rejection response to the user equipment.

Optionally, the resource obtaining request may be sent by the user equipment in a random access phase.

S1202: The first network node sends a resource obtaining response to the user equipment in response to the resource obtaining request.

Optionally, the resource obtaining response may include resource selection indication information, and the resource selection indication information is used to indicate an extent to which the first network node can accept the resource obtaining request of the user equipment. The resource selection indication information may include: uplink grant information allocated by the first network node to the user equipment; or a resource use status of a cell of the first network node (for example, one or more of load information of a cell of the first network node, an idle uplink data transmission resource of the cell, or a usage of an uplink data transmission resource of the cell); or service indication information of the first network node.

In this aspect of the present disclosure, a first network node can return a resource obtaining response according to a resource obtaining request sent by user equipment, so that when receiving resource obtaining responses sent by multiple first network nodes, the user equipment determines, from the multiple first network nodes, a serving network node that provides an uplink data transmission resource for the user equipment, and accesses the serving network node, thereby quickly and effectively obtaining an uplink data transmission resource.

Figure 13:
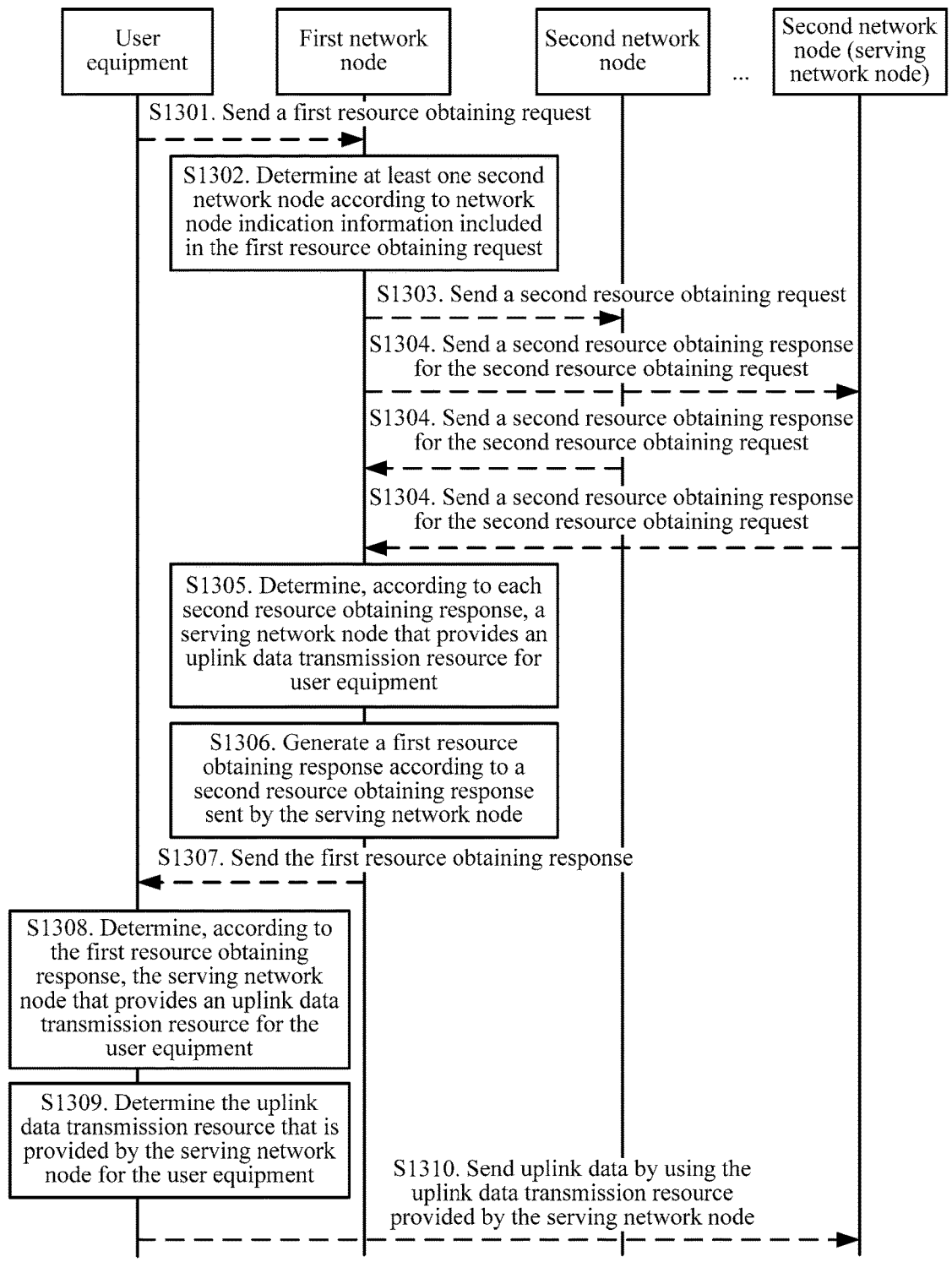
FIG. 13 is a schematic flowchart of still another uplink data transmission resource obtaining method according to an aspect of the present disclosure.

Referring to FIG. 13, FIG. 13 is a schematic flowchart of still another uplink data transmission resource obtaining method according to an aspect of the present disclosure. As shown in FIG. 13, the uplink data transmission resource obtaining method may include the following steps.

S1301: User equipment sends a first resource obtaining request to a first network node.

In this aspect of the present disclosure, when needing to send uplink data, the user equipment sends the first resource obtaining request to the first network node. The first network node may be a network node to which a cell on which the user equipment camps belongs, or may be a network node to which a macro coverage cell in which the user equipment is located belongs, or may be a network node having a context of or a signaling connection to the user equipment. Specifically, the first network node is a node having an air interface data transmission resource allocation function. The first resource obtaining request is used to obtain an uplink data transmission resource, and the uplink data transmission resource is used by the user equipment to transmit the uplink data.

Optionally, the first resource obtaining request may be sent in a random access phase of the user equipment. For example, the first resource obtaining request is a random access preamble sent by the user equipment. Alternatively, the first resource obtaining request may be sent in a data sending phase. For example, the first resource obtaining request is radio resource control (RRC) signaling or an uplink user data packet sent by the user equipment.

Optionally, the first resource obtaining request may include network node indication information. The network node indication information is used by the first network node to determine at least one second network node that can provide an uplink data transmission resource for the user equipment. The network node indication information may include: a node identifier of each second network node, or an identifier of a cell, which can provide an uplink data transmission resource for the user equipment, of each second network node, or location information of the user equipment. This is not limited in this aspect of the present disclosure.

Optionally, the at least one second network node may be all second network nodes that are determined by the user equipment and that can provide an uplink data transmission resource for the user equipment, or may be some second network nodes that are determined by the user equipment from all second network nodes that can provide an uplink data transmission resource for the user equipment. This is not limited in this aspect of the present disclosure.

Further optionally, when the at least one second network node is some second network nodes that are determined by the user equipment from all second network nodes that can provide an uplink data transmission resource for the user equipment, the user equipment may determine, according to measurement results of transmitted and received signal quality of all the second network nodes, each of the multiple second network nodes needing to be included in the network node indication information. Alternatively, the user equipment may determine, according to service types supported by cells of all the second network nodes and signal quality measurement results, each of the multiple second network nodes needing to be included in the network node indication information.

Further optionally, when the first resource obtaining request is sent in the random access phase of the user equipment, the user equipment may indicate all the second network nodes to the first network node by using different access preambles or different access occasions. Alternatively, the user equipment may indicate all the second network nodes to the first network node by sending, when sending an access preamble, a data packet including node information of all the second network nodes. This is not limited in this aspect of the present disclosure.

Further optionally, when the at least one second network node is some second network nodes that are determined by the user equipment from all second network nodes that can provide an uplink data transmission resource for the user equipment, the user equipment may determine, according to measurement results of transmitted and received signal quality of all the second network nodes, each of the multiple second network nodes needing to be included in the network node indication information. Alternatively, the user equipment may determine, according to service types supported by cells of all the second network nodes and signal quality measurement results, each of the multiple second network nodes needing to be included in the network node indication information.

Further optionally, when the first resource obtaining request is sent in the random access phase of the user equipment, the user equipment may indicate all the second network nodes to the first network node by using different access preambles or different access occasions. Alternatively, the user equipment may indicate all the second network nodes to the first network node by sending, when sending an access preamble, a data packet including node information of all the second network nodes. This is not limited in this aspect of the present disclosure.

S1302: The first network node determines at least one second network node according to network node indication information included in the first resource obtaining request.

S1303: The first network node separately sends a second resource obtaining request to each second network node.

S1304: The second network node sends, to the first network node, a second resource obtaining response for the second resource obtaining request.

In this aspect of the present disclosure, the second resource obtaining response may include node information of the second network node sending the second resource obtaining response.

In this aspect of the present disclosure, after the second resource obtaining request sent by the first network node is received, when the second network node has an idle uplink data transmission resource, the second network node performs step S1304. When the second network node does not have an idle uplink data transmission resource, the second network node may not send any response message to the first network node, or send a resource obtaining rejection response to the first network node.

S1305: The first network node determines, according to each second resource obtaining response, a serving network node that provides an uplink data transmission resource for the user equipment.

S1306: The first network node generates a first resource obtaining response according to a second resource obtaining response sent by the serving network node.

In this aspect of the present disclosure, the first resource obtaining response may include node information of the serving network node.

S1307: The first network node sends the first resource obtaining response to the user equipment.

S1308: The user equipment determines, according to the first resource obtaining response, the serving network node that provides an uplink data transmission resource for the user equipment.

S1309: The user equipment determines the uplink data transmission resource that is provided by the serving network node for the user equipment.

Optionally, the user equipment may send another random access request to the serving network node to obtain the uplink data transmission resource. The random access request may be sent by using a dedicated preamble corresponding to the serving network node in the first resource obtaining response, or may be sent by using a random access preamble selected by the user equipment from available random access preambles of a corresponding cell of the serving network node.

S1310: The user equipment sends uplink data to the serving network node by using the uplink data transmission resource provided by the serving network node.

In an optional implementation, the second resource obtaining response may further include a dedicated preamble of a corresponding cell of the second network node sending the second resource obtaining response and identification information allocated by the second network node to the user equipment, and the first resource obtaining response may further include a dedicated preamble of a corresponding cell of the serving network node and identification information allocated by the serving network node to the user equipment. Alternatively, each second resource obtaining response may further include identification information allocated to the user equipment by the second network node sending the second resource obtaining response and uplink grant information allocated by the second network node to the user equipment, and the first resource obtaining response may further include identification information allocated by the serving network node to the user equipment and uplink grant information allocated by the serving network node to the user equipment. Alternatively, each second resource obtaining response may further include identification information allocated to the user equipment by the second network node sending the second resource obtaining response, uplink grant information allocated by the second network node to the user equipment, and synchronization information of the second network node, and the first resource obtaining response may further include identification information allocated by the serving network node to the user equipment, uplink grant information allocated by the serving network node to the user equipment, and synchronization information of the serving network node.

By means of this aspect of the present disclosure, user equipment accesses a serving network node selected by a first network node for the user equipment, thereby quickly and effectively obtaining an uplink data transmission resource used to transmit uplink data.

Figure 14:
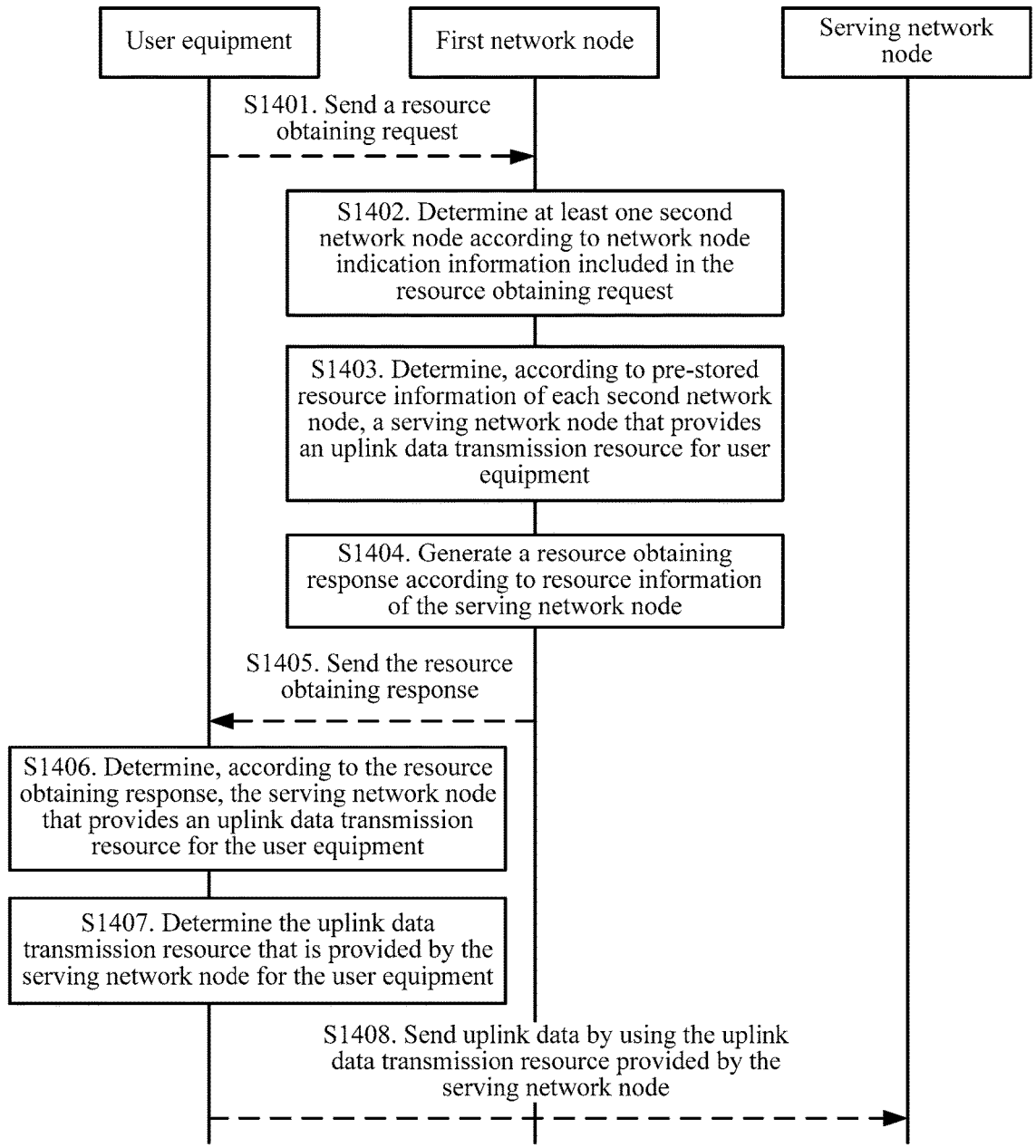
FIG. 14 is a schematic flowchart of still another uplink data transmission resource obtaining method according to an aspect of the present disclosure.

Referring to FIG. 14, FIG. 14 is a schematic flowchart of still another uplink data transmission resource obtaining method according to an aspect of the present disclosure. As shown in FIG. 14, the uplink data transmission resource obtaining method may include the following steps.

S1401: User equipment sends a resource obtaining request to a first network node.

In this aspect of the present disclosure, when needing to send uplink data, the user equipment sends the resource obtaining request to the first network node. The first network node may be a network node to which a cell on which the user equipment camps belongs, or may be a network node to which a macro coverage cell in which the user equipment is located belongs, or may be a network node having a context of or a signaling connection to the user equipment. Specifically, the first network node is a node having an air interface data transmission resource allocation function. The resource obtaining request is used to obtain an uplink data transmission resource, and the uplink data transmission resource is used by the user equipment to transmit the uplink data.

Optionally, the resource obtaining request may include network node indication information. The network node indication information is used by the first network node to determine at least one second network node that can provide an uplink data transmission resource for the user equipment. The network node indication information may include: a node identifier of each second network node, or an identifier of a cell, which can provide an uplink data transmission resource for the user equipment, of each second network node, or location information of the user equipment. This is not limited in this aspect of the present disclosure.

S1402: The first network node determines at least one second network node according to network node indication information included in the resource obtaining request.

S1403: The first network node determines, according to pre-stored resource information of each second network node, a serving network node that provides an uplink data transmission resource for the user equipment.

In this aspect of the present disclosure, the first network node pre-stores the resource information of each second network node. When resource information of a second network node stored in the first network node is lower than a threshold, the first network node requests the second network node to allocate new resource information.

S1404: The first network node generates a resource obtaining response according to resource information of the serving network node.

In this aspect of the present disclosure, the resource obtaining response may include node information of the serving network node that is determined by the first network node and that provides an uplink data transmission resource for the user equipment.

S1405: The first network node sends the resource obtaining response to the user equipment.

S1406: The user equipment determines, according to the resource obtaining response, the serving network node that provides an uplink data transmission resource for the user equipment.

S1407: The user equipment determines the uplink data transmission resource that is provided by the serving network node for the user equipment.

S1408: The user equipment sends uplink data to the serving network node by using the uplink data transmission resource provided by the serving network node.

In an optional implementation, the resource obtaining response may further include a dedicated preamble of a corresponding cell of the serving network node and identification information allocated by the serving network node to the user equipment. Alternatively, the resource obtaining response may further include identification information allocated by the serving network node to the user equipment and uplink grant information allocated by the serving network node to the user equipment. Alternatively, the resource obtaining response further includes identification information allocated by the serving network node to the user equipment, uplink grant information allocated by the serving network node to the user equipment, and synchronization information of the serving network node. This is not limited in this aspect of the present disclosure.

By means of this aspect of the present disclosure, user equipment accesses a serving network node selected by a first network node for the user equipment, thereby quickly and effectively obtaining an uplink data transmission resource used to transmit uplink data.

Figure 15:
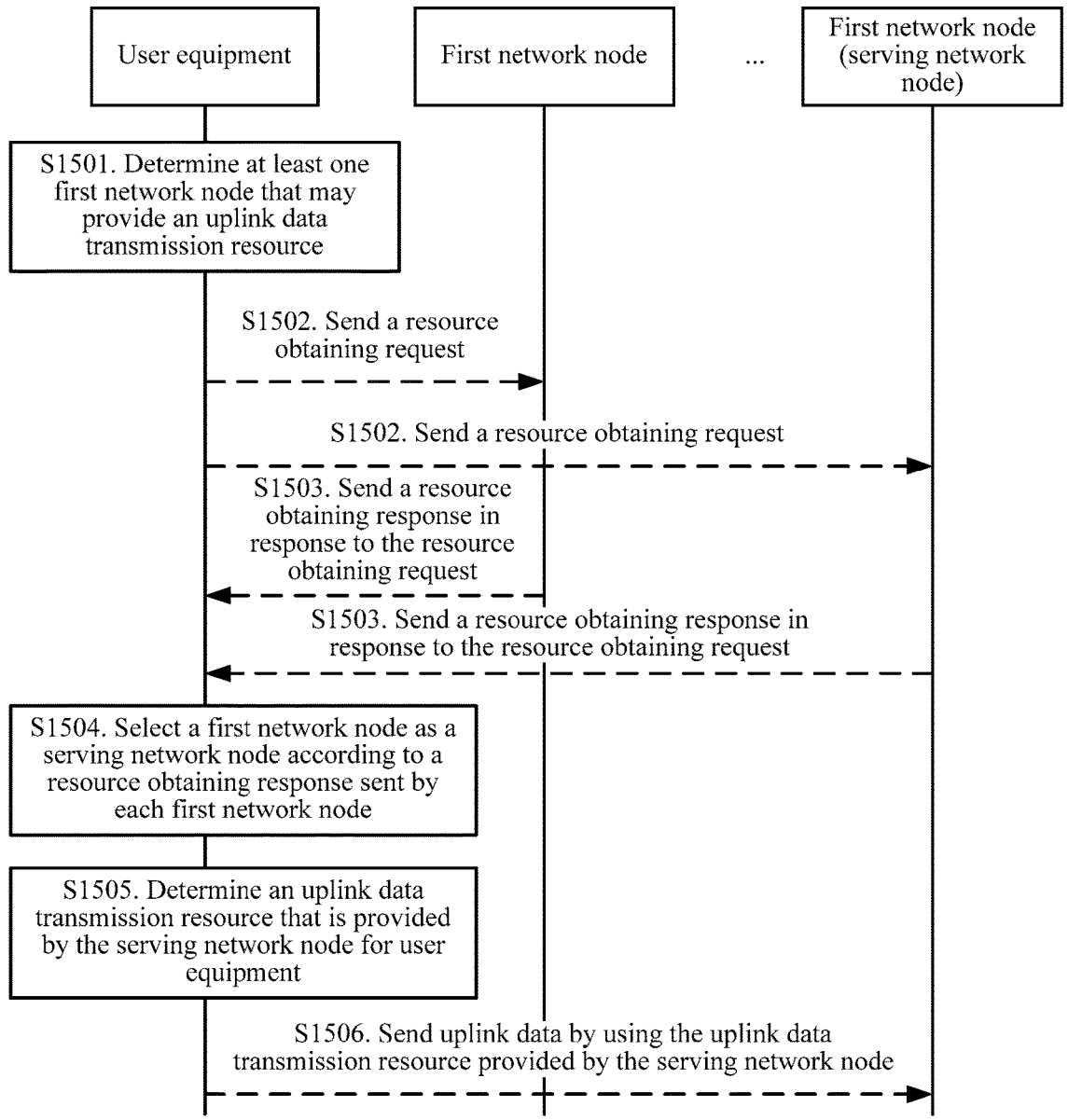
FIG. 15 is a schematic flowchart of still another uplink data transmission resource obtaining method according to an aspect of the present disclosure.

Referring to FIG. 15, FIG. 15 is a schematic flowchart of still another uplink data transmission resource obtaining method according to an aspect of the present disclosure. As shown in FIG. 15, the uplink data transmission resource obtaining method may include the following steps.

S1501: User equipment determines at least one first network node that can provide an uplink data transmission resource.

In this aspect of the present disclosure, the at least one first network node determined by the user equipment may be all first network nodes that may be detected by the user equipment and that can provide an uplink data transmission resource for the user equipment, or may be some first network nodes that are determined by the user equipment from all first network nodes that can provide an uplink data transmission resource for the user equipment. This is not limited in this aspect of the present disclosure. Further, the user equipment determines a cell, which can provide an uplink data transmission resource, of the first network node.

Optionally, when the at least one first network node determined by the user equipment is some first network nodes that are determined by the user equipment from all first network nodes that are detected by the user equipment and that can provide an uplink data transmission resource for the user equipment, the user equipment may determine the at least one first network node according to measurement results of transmitted and received signal quality of all the first network nodes, or according to service types and/or device types supported by cells of all the first network nodes and signal quality measurement results. This is not limited in this aspect of the present disclosure.

S1502: The user equipment sends a resource obtaining request to each first network node.

In this aspect of the present disclosure, the resource obtaining request is used to obtain an uplink data transmission resource used by the user equipment to transmit uplink data.

Optionally, the user equipment may separately send a resource obtaining request to each first network node, or the user equipment sends a common resource obtaining request to each first network node. Each first network node can receive and parse the resource obtaining request sent by the user equipment.

S1503: The first network node sends a resource obtaining response to the user equipment in response to the resource obtaining request.

Optionally, when the user equipment receives the resource obtaining response, if the resource obtaining response is not sent by the first network node or the cell of the first network node that is determined by the user equipment in S1501, the user equipment may ignore the resource obtaining response, and continue to send a resource obtaining request.

In this aspect of the present disclosure, after the resource obtaining request sent by the user equipment is received, when the first network node has an available uplink data transmission resource, the first network node performs step S1503. When the first network node does not have an available uplink data transmission resource, the first network node may not send any response message to the user equipment, or send a resource obtaining rejection response to the user equipment.

Optionally, the resource obtaining response may include resource selection indication information, and the resource selection indication information is used to indicate an extent to which the first network node can accept the resource obtaining request of the user equipment. The resource selection indication information may include: uplink grant information allocated by the first network node to the user equipment; or a resource use status of a corresponding cell of the first network node (for example, one or more of load information of a corresponding cell of the first network node, an available uplink data transmission resource of the cell, or a usage of an uplink data transmission resource of the cell); or service indication information of the first network node.

S1504: The user equipment selects a first network node as a serving network node according to a resource obtaining response sent by at least one first network node.

S1505: The user equipment determines an uplink data transmission resource that is provided by the serving network node for the user equipment.

S1506: The user equipment sends uplink data to the serving network node by using the uplink data transmission resource provided by the serving network node.

Optionally, the uplink data transmission resource means an uplink data transmission resource corresponding to grant information included in a resource obtaining response sent by the serving network node.

In this aspect of the present disclosure, a first network node can return a resource obtaining response according to a resource obtaining request sent by user equipment, so that when receiving resource obtaining responses sent by multiple first network nodes, the user equipment determines, from the multiple first network nodes, a serving network node that provides an uplink data transmission resource for the user equipment, and accesses the serving network node, thereby quickly and effectively obtaining an uplink data transmission resource.

Figure 16:
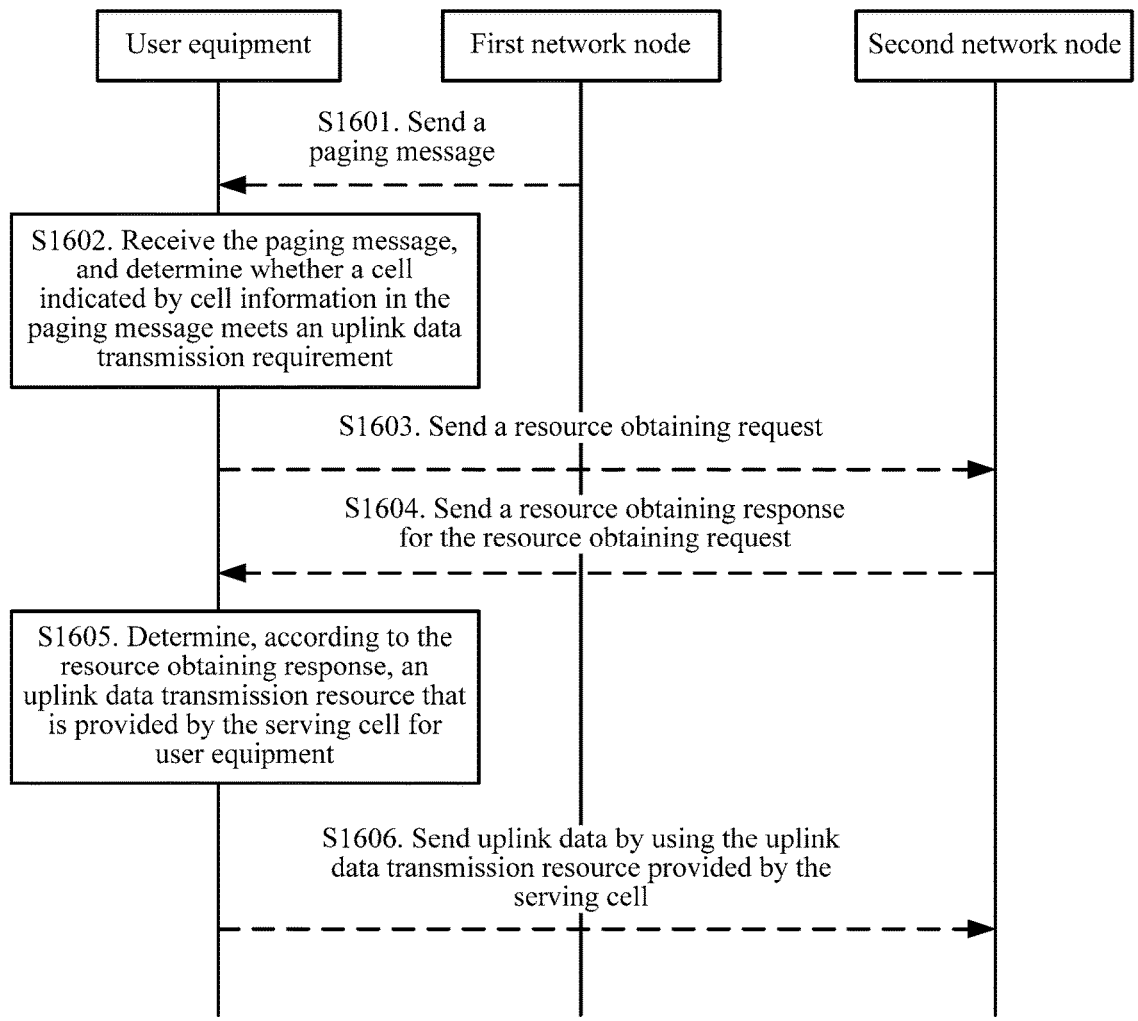
FIG. 16 is a schematic flowchart of still another uplink data transmission resource obtaining method according to an aspect of the present disclosure.

Referring to FIG. 16, FIG. 16 is a schematic flowchart of still another uplink data transmission resource obtaining method according to an aspect of the present disclosure. As shown in FIG. 16, the uplink data transmission resource obtaining method may include the following steps.

S1601: A first network node sends a paging message to user equipment.

In this aspect of the present disclosure, the first network node may be a network node to which a cell on which the user equipment camps belongs, or may be a network node to which a macro coverage cell in which the user equipment is located belongs, or may be a network node having a context of or a signaling connection to the user equipment. This is not limited in this aspect of the present disclosure. The paging message is used to instruct the user equipment to send a resource obtaining request to a second network node. The paging message may include at least one of cell information of a cell of the second network node, channel configuration information or access sequence information of the cell of the second network node, or the like.

S1602: The user equipment receives the paging message, and determines whether a cell indicated by cell information in the paging message meets an uplink data transmission requirement.

In this aspect of the present disclosure, when a determining result in step S1602 is yes, the user equipment performs step S1603. When a determining result in step S1602 is no, that is, when the cell indicated by the cell information in the paging message does not meet the uplink data transmission requirement, the user equipment may ignore the paging message, select another cell that can provide an uplink data transmission resource for the user equipment, and transmit uplink data by using an obtained uplink data transmission resource of the cell.

Optionally, the user equipment may determine, according to a signal measurement result, whether the cell indicated by the cell information in the paging message meets the uplink data transmission requirement. That is, if signal quality or signal strength of the cell is higher than a threshold, the user equipment determines that the cell meets the uplink data transmission requirement. Further optionally, when the user equipment determines that multiple cells meet the uplink data transmission requirement, the user equipment may select a cell whose signal quality is optimum or signal strength is maximum as a serving cell.

S1603: The user equipment sends a resource obtaining request to a second network node.

In this aspect of the present disclosure, the resource obtaining request is used to obtain an uplink data transmission resource that is provided for the user equipment by the serving cell determined by the user equipment.

S1604: The second network node sends, to the user equipment, a resource obtaining response for the resource obtaining request.

S1605: The user equipment determines, according to the resource obtaining response, an uplink data transmission resource that is provided by the serving cell for the user equipment.

S1606: The user equipment sends uplink data to the second network node by using the uplink data transmission resource provided by the serving cell.

Preferably, before the first network node sends the paging message to the user equipment, the first network node further needs to obtain location information of the user equipment, so that the first network node determines, according to the location information of the user equipment, a second network node from all second network nodes that can provide an uplink data transmission resource for the user equipment. Specifically, the user equipment may first notify a cell of a third network node of the location information of the user equipment, so that the cell of the third network node notifies the first network node of the location information of the user equipment, and the first network node obtains the location information of the user equipment. Alternatively, the user equipment may directly notify the first network node of the location information of the user equipment, so that the first network node obtains the location information of the user equipment. This is not limited in this aspect of the present disclosure.

As can be seen, by means of this aspect of the present disclosure, low-speed or stationary user equipment can be paged in limited cells, reducing unnecessary paging overheads. In addition, the user equipment can quickly access an appropriate cell for uplink data transmission.

Figure 19:
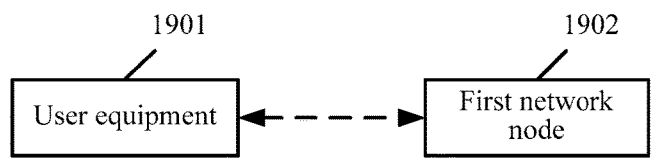
FIG. 19 is a schematic structural diagram of an uplink data transmission resource obtaining system according to an aspect of the present disclosure.

Referring to FIG. 19, FIG. 19 is a schematic structural diagram of an uplink data transmission resource obtaining system according to an aspect of the present disclosure. As shown in FIG. 19, the system may include: user equipment 1901 and a first network node 1902.

The user equipment 1901 is configured to: send a first resource obtaining request to the first network node 1902, receive a first resource obtaining response that is sent by the first network node 1902 for the first resource obtaining request, determine, according to the first resource obtaining response, a serving network node that provides an uplink data transmission resource for the user equipment 1901, determine the uplink data transmission resource that is provided by the serving network node for the user equipment 1901, and send uplink data to the serving network node by using the uplink data transmission resource provided by the serving network node. The resource obtaining request is used to obtain the uplink data transmission resource, and the resource obtaining response includes node information of the serving network node.

The first network node 1902 is configured to receive the first resource obtaining request sent by the user equipment 1901, and send the first resource obtaining response to the user equipment 1901 in response to the first resource obtaining request.

Figure 20:
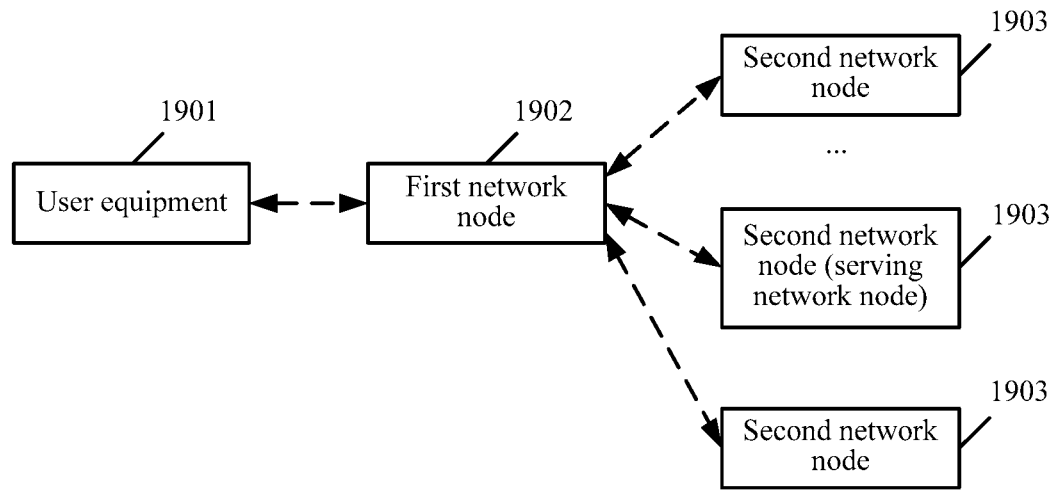
FIG. 20 is a schematic structural diagram of another uplink data transmission resource obtaining system according to an aspect of the present disclosure.

Optionally, the first resource obtaining request may include network node indication information, the network node indication information is used by the first network node 1902 to determine at least one second network node that can provide an uplink data transmission resource for the user equipment 1901, and the at least one second network node includes the serving network node. The network node indication information includes: a node identifier of each second network node, or an identifier of a cell, which can provide an uplink data transmission resource for the user equipment 1901, of each second network node, or location information of the user equipment 1901. The system may further include at least one second network node 1903. In this case, a structure of the uplink data transmission resource obtaining system may be shown in FIG. 20. FIG. 20 is a schematic structural diagram of another uplink data transmission resource obtaining system according to an aspect of the present disclosure.

In an optional implementation, a specific manner of sending, by the first network node 1902, the first resource obtaining response to the user equipment 1901 in response to the first resource obtaining request may be:

determining the at least one second network node 1903 according to the network node indication information;

sending a second resource obtaining request to each second network node 1903;

receiving a second resource obtaining response that is sent by each second network node 1903 for the second resource obtaining request received by the second network node 1903, where each second resource obtaining response includes node information of a second network node 1903 sending the second resource obtaining response;

determining, according to each second resource obtaining response, the serving network node that provides an uplink data transmission resource for the user equipment 1901; and generating a first resource obtaining response according to a second resource obtaining response sent by the serving network node, and sending the first resource obtaining response to the user equipment 1901; and the second network node 1903 is configured to send the second resource obtaining response to the first network node for the second resource obtaining request received by the second network node 1903.

In this optional implementation, optionally, each second resource obtaining response may further include a dedicated preamble of a cell of the second network node 1903 sending the second resource obtaining response and identification information allocated by the second network node 1903 to the user equipment 1901, and the first resource obtaining response may further include a dedicated preamble of a cell of the serving network node and identification information allocated by the serving network node to the user equipment 1901; or each second resource obtaining response may further include identification information allocated to the user equipment by the second network node 1903 sending the second resource obtaining response and uplink grant information allocated by the second network node 1903 to the user equipment 1901, and the first resource obtaining response may further include identification information allocated by the serving network node to the user equipment 1901 and uplink grant information allocated by the serving network node to the user equipment 1901; or each second resource obtaining response may further include identification information allocated to the user equipment 1901 by the second network node 1903 sending the second resource obtaining response, uplink grant information allocated by the second network node 1903 to the user equipment 1901, and synchronization information of the second network node 1903, and the first resource obtaining response may further include identification information allocated by the serving network node to the user equipment 1901, uplink grant information allocated by the serving network node to the user equipment 1901, and synchronization information of the serving network node.

In another optional implementation, a specific manner of sending, by the first network node 1902, the first resource obtaining response to the user equipment 1901 in response to the first resource obtaining request may be:

determining the at least one second network node 1903 according to the network node indication information;

determining, according to pre-stored resource information of each second network node 1903, the serving network node that provides an uplink data transmission resource for the user equipment 1901; and generating a first resource obtaining response according to resource information of the serving network node, and sending the first resource obtaining response to the user equipment 1901.

In the another optional implementation, the first network node 1902 pre-stores the resource information of each second network node 1903. When receiving the resource obtaining request sent by the user equipment 1901, the first network node 1902 allocates the pre-stored resource information to the user equipment 1901. Optionally, when resource information of a second network node 1903 stored in the first network node 1902 is lower than a threshold, the first network node 1902 may be further configured to request the second network node 1903 to allocate new resource information, that is:

the first network node 1902 may be further configured to send a resource information obtaining request to the second network node 1903.

Optionally, the first network node 1902 may indicate, to the second network node 1903, resource information of which cells needs to be obtained; and the second network node 1903 may be further configured to send, to the first network node 1901, a resource information obtaining response for the resource information obtaining request.

In the another optional implementation, optionally, the first resource obtaining response may further include a dedicated preamble of a cell of the serving network node and identification information allocated by the serving network node to the user equipment 1901; or the first resource obtaining response may further include identification information allocated by the serving network node to the user equipment 1901 and uplink grant information allocated by the serving network node to the user equipment 1901; or the first resource obtaining response may further include identification information allocated by the serving network node to the user equipment 1901, uplink grant information allocated by the serving network node to the user equipment 1901, and synchronization information of the serving network node.

In still another optional aspect, when the first resource obtaining response further includes the dedicated preamble of the cell of the serving network node, a specific manner of determining, by the user equipment 1901, the uplink data transmission resource that is provided by the serving network node for the user equipment 1901 may be:

sending a random access request to the serving network node by using the dedicated preamble of the cell of the serving network node; and receiving a random access response that is sent by the serving network node for the random access request, and determining an uplink data transmission resource included in the random access response as the uplink data transmission resource that is provided by the serving network node for the user equipment 1901.

By means of this aspect of the present disclosure, the user equipment accesses a serving network node selected by the first network node for the user equipment, thereby quickly and effectively obtaining an uplink data transmission resource used to transmit uplink data.

Figure 21:
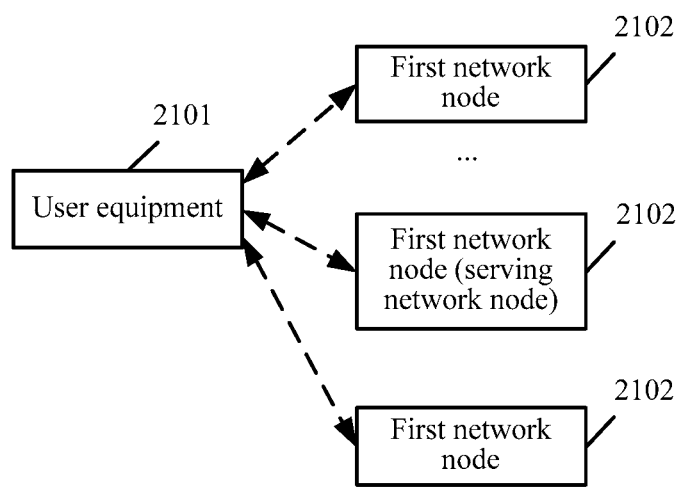
FIG. 21 is a schematic structural diagram of still another uplink data transmission resource obtaining system according to an aspect of the present disclosure.

Referring to FIG. 21, FIG. 21 is a schematic structural diagram of still another uplink data transmission resource obtaining system according to an aspect of the present disclosure. As shown in FIG. 21, the system may include: user equipment 2101 and at least one first network node 2102.

The user equipment 2101 is configured to determine the at least one first network node 2102 that can provide an uplink data transmission resource, send a resource obtaining request to each first network node 2102, receive a resource obtaining response that is sent by each first network node 2102 for the resource obtaining request received by the first network node 2102, select a first network node 2102 as a serving network node according to each resource obtaining response, determine an uplink data transmission resource that is provided by the serving network node for the user equipment 2101, and send uplink data to the serving network node by using the uplink data transmission resource provided by the serving network node. The resource obtaining request is used to obtain the uplink data transmission resource.

The first network node 2102 is configured to receive the resource obtaining request sent by the user equipment 2101, and send the resource obtaining response to the user equipment 1901 in response to the resource obtaining request.

Optionally, the resource obtaining response includes resource selection indication information, and the resource selection indication information is used to indicate an extent to which the first network node 2102 can accept the resource obtaining request of the user equipment 2102. The resource selection indication information includes: uplink grant information allocated by the first network node 2102 to the user equipment 2101, or load information of the first network node 2102, or service indication information of the first network node 2102.

Optionally, a specific manner of determining, by the user equipment 2101, the at least one first network node 2102 that can provide an uplink data transmission resource may be:

determining, according to measurement results of transmitted and received signal quality of all the first network nodes 2102 or service types supported by cells of all the first network nodes, the at least one first network node 2102 that can provide an uplink data transmission resource, where all the first network nodes 2102 include all first network nodes 2102 that can provide an uplink data transmission resource for the user equipment 2101.

Embodiments of the present invention disclose an uplink data transmission resource obtaining method and system, and a device, so that user equipment can quickly and effectively obtain an uplink data transmission resource used to transmit uplink data.

A first aspect of the present disclosure discloses user equipment, including: a first communication module, a determining module, and a second communication module, where:

the first communication module is configured to: send a resource obtaining request to a first network node, and receive a resource obtaining response that is sent by the first network node for the resource obtaining request, where the resource obtaining request is used to obtain an uplink data transmission resource, and the resource obtaining response includes node information of a serving network node;

the determining module is configured to: determine, according to the resource obtaining response, the serving network node that provides an uplink data transmission resource for the user equipment, and determine the uplink data transmission resource that is provided by the serving network node for the user equipment; and the second communication module is configured to send uplink data to the serving network node by using the uplink data transmission resource provided by the serving network node.

With reference to the first aspect of the present disclosure, in a first possible implementation of the first aspect of the present disclosure, the resource obtaining request includes network node indication information, the network node indication information is used by the first network node to determine at least one second network node that can provide an uplink data transmission resource for the user equipment, and the at least one second network node includes the serving network node; and the network node indication information includes:

a node identifier of each second network node; or an identifier of a cell, which can provide an uplink data transmission resource for the user equipment, of each second network node; or location information of the user equipment.

With reference to the first aspect of the present disclosure or the first possible implementation of the first aspect of the present disclosure, in a second possible implementation of the first aspect of the present disclosure, the resource obtaining response further includes a dedicated preamble of a cell of the serving network node and identification information allocated by the serving network node to the user equipment; or the resource obtaining response further includes identification information allocated by the serving network node to the user equipment and uplink grant information allocated by the serving network node to the user equipment; or the resource obtaining response further includes identification information allocated by the serving network node to the user equipment, uplink grant information allocated by the serving network node to the user equipment, and synchronization information of the serving network node.

With reference to the second possible implementation of the first aspect of the present disclosure, in a third possible implementation of the first aspect of the present disclosure, when the resource obtaining response further includes the dedicated preamble, a specific manner of determining, by the determining module, the uplink data transmission resource that is provided by the serving network node for the user equipment is:

sending a random access request to the serving network node by using the dedicated preamble; and receiving a random access response that is sent by the serving network node for the random access request, and determining an uplink data transmission resource included in the random access response as the uplink data transmission resource that is provided by the serving network node for the user equipment.

A second aspect of the present disclosure discloses user equipment, including: a first determining module, a first communication module, a second determining module, and a second communication module, where:

the first determining module is configured to determine at least one first network node that can provide an uplink data transmission resource;

the first communication module is configured to: send a resource obtaining request to each first network node, and receive a resource obtaining response that is sent by each first network node for the resource obtaining request received by the first network node, where the resource obtaining request is used to obtain an uplink data transmission resource;

the second determining module is configured to: select a first network node as a serving network node according to each resource obtaining response, and determine an uplink data transmission resource that is provided by the serving network node for the user equipment; and the second communication module is configured to send uplink data to the serving network node by using the uplink data transmission resource provided by the serving network node.

With reference to the second aspect of the present disclosure, in a first possible implementation of the second aspect of the present disclosure, the resource obtaining response includes resource selection indication information, and the resource selection indication information is used to indicate an extent to which the first network node can accept the resource obtaining request of the user equipment; and the resource selection indication information includes:

uplink grant information allocated by the first network node to the user equipment; or load information of the first network node; or service indication information of the first network node.

With reference to the second aspect of the present disclosure or the first possible implementation of the second aspect of the present disclosure, in a second possible implementation of the second aspect of the present disclosure, a specific manner of determining, by the first determining module, at least one first network node that can provide an uplink data transmission resource is:

determining, according to measurement results of transmitted and received signal quality of all the first network nodes or service types supported by cells of all the first network nodes, the at least one first network node that can provide an uplink data transmission resource, where all the first network nodes include all first network nodes that can provide an uplink data transmission resource for the user equipment.

A third aspect of the present disclosure discloses user equipment, including: a processor, a memory, and a communications interface, where the communications interface is configured to: send a resource obtaining request to a first network node, and receive a resource obtaining response that is sent by the first network node for the resource obtaining request, where the resource obtaining request is used to obtain an uplink data transmission resource, and the resource obtaining response includes node information of a serving network node;

the memory stores a set of program code, and the processor is configured to invoke the program code stored in the memory, to perform the following operation:

determining, according to the resource obtaining response, the serving network node that provides an uplink data transmission resource for the user equipment, and determining the uplink data transmission resource that is provided by the serving network node for the user equipment; and the communications interface is further configured to send uplink data to the serving network node by using the uplink data transmission resource provided by the serving network node.

With reference to the third aspect of the present disclosure, in a first possible implementation of the third aspect of the present disclosure, the resource obtaining request includes network node indication information, the network node indication information is used by the first network node to determine at least one second network node that can provide an uplink data transmission resource for the user equipment, and the at least one second network node includes the serving network node; and the network node indication information includes:

a node identifier of each second network node; or an identifier of a cell, which can provide an uplink data transmission resource for the user equipment, of each second network node; or location information of the user equipment.

With reference to the third aspect of the present disclosure or the first possible implementation of the third aspect of the present disclosure, in a second possible implementation of the third aspect of the present disclosure, the resource obtaining response further includes a dedicated preamble of a cell of the serving network node and identification information allocated by the serving network node to the user equipment; or the resource obtaining response further includes identification information allocated by the serving network node to the user equipment and uplink grant information allocated by the serving network node to the user equipment; or the resource obtaining response further includes identification information allocated by the serving network node to the user equipment, uplink grant information allocated by the serving network node to the user equipment, and synchronization information of the serving network node.

With reference to the second possible implementation of the third aspect of the present disclosure, in a third possible implementation of the third aspect of the present disclosure, when the resource obtaining response further includes the dedicated preamble, a specific manner of determining, by the processor, the uplink data transmission resource that is provided by the serving network node for the user equipment is:

sending a random access request to the serving network node by using the dedicated preamble; and receiving a random access response that is sent by the serving network node for the random access request, and determining an uplink data transmission resource included in the random access response as the uplink data transmission resource that is provided by the serving network node for the user equipment.

A fourth aspect of the present disclosure discloses user equipment, including: a processor, a memory, and a communications interface, where the memory stores a set of program code, and the processor is configured to invoke the program code stored in the memory, to perform the following operation:

determining at least one first network node that can provide an uplink data transmission resource;

the communications interface is configured to: send a resource obtaining request to each first network node, and receive a resource obtaining response that is sent by each first network node for the resource obtaining request received by the first network node, where the resource obtaining request is used to obtain an uplink data transmission resource;

the processor is configured to invoke the program code stored in the memory, to further perform the following operation:

selecting a first network node as a serving network node according to each resource obtaining response, and determining an uplink data transmission resource that is provided by the serving network node for the user equipment; and the communications interface is further configured to send uplink data to the serving network node by using the uplink data transmission resource provided by the serving network node.

With reference to the fourth aspect of the present disclosure, in a first possible implementation of the fourth aspect of the present disclosure, the resource obtaining response includes resource selection indication information, and the resource selection indication information is used to indicate an extent to which the first network node can accept the resource obtaining request of the user equipment; and the resource selection indication information includes:

uplink grant information allocated by the first network node to the user equipment; or load information of the first network node; or service indication information of the first network node.

With reference to the fourth aspect of the present disclosure or the first possible implementation of the fourth aspect of the present disclosure, in a second possible implementation of the fourth aspect of the present disclosure, a specific manner of determining, by the processor, at least one first network node that can provide an uplink data transmission resource is:

determining, according to measurement results of transmitted and received signal quality of all the first network nodes or service types supported by cells of all the first network nodes, the at least one first network node that can provide an uplink data transmission resource, where all the first network nodes include all first network nodes that can provide an uplink data transmission resource for the user equipment.

A fifth aspect of the present disclosure discloses a network node, including: a receiving module and a sending module, where:

the receiving module is configured to receive a first resource obtaining request sent by user equipment, where the first resource obtaining request is used to obtain an uplink data transmission resource; and the sending module is configured to send a first resource obtaining response to the user equipment in response to the first resource obtaining request, where the first resource obtaining response includes node information of a serving network node that is determined by the network node and that provides an uplink data transmission resource for the user equipment.

With reference to the fifth aspect of the present disclosure, in a first possible implementation of the fifth aspect of the present disclosure, the first resource obtaining request includes network node indication information, the network node indication information is used by the network node to determine at least one second network node that can provide an uplink data transmission resource for the user equipment, and the at least one second network node includes the serving network node; and the network node indication information includes:

a node identifier of each second network node; or an identifier of a cell, which can provide an uplink data transmission resource for the user equipment, of each second network node; or location information of the user equipment.

With reference to the first possible implementation of the fifth aspect of the present disclosure, in a second possible implementation of the fifth aspect of the present disclosure, a specific manner of sending, by the sending module, a first resource obtaining response to the user equipment in response to the first resource obtaining request is:

determining the at least one second network node according to the network node indication information;

sending a second resource obtaining request to each second network node;

receiving a second resource obtaining response that is sent by each second network node for the second resource obtaining request received by the second network node, where each second resource obtaining response includes node information of a second network node sending the second resource obtaining response;

determining, according to each second resource obtaining response, the serving network node that provides an uplink data transmission resource for the user equipment; and generating a first resource obtaining response according to a second resource obtaining response sent by the serving network node, and sending the first resource obtaining response to the user equipment.

With reference to the second possible implementation of the fifth aspect of the present disclosure, in a third possible implementation of the fifth aspect of the present disclosure, each second resource obtaining response further includes a dedicated preamble of a cell of the second network node sending the second resource obtaining response and identification information allocated by the second network node to the user equipment, and the first resource obtaining response further includes a dedicated preamble of a cell of the serving network node and identification information allocated by the serving network node to the user equipment; or each second resource obtaining response further includes identification information allocated to the user equipment by the second network node sending the second resource obtaining response and uplink grant information allocated by the second network node to the user equipment, and the first resource obtaining response further includes identification information allocated by the serving network node to the user equipment and uplink grant information allocated by the serving network node to the user equipment; or each second resource obtaining response further includes identification information allocated to the user equipment by the second network node sending the second resource obtaining response, uplink grant information allocated by the second network node to the user equipment, and synchronization information of the second network node, and the first resource obtaining response further includes identification information allocated by the serving network node to the user equipment, uplink grant information allocated by the serving network node to the user equipment, and synchronization information of the serving network node.

With reference to the first possible implementation of the fifth aspect of the present disclosure, in a fourth possible implementation of the fifth aspect of the present disclosure, a specific manner of sending, by the sending module, a first resource obtaining response to the user equipment in response to the first resource obtaining request is:

determining the at least one second network node according to the network node indication information;

determining, according to pre-stored resource information of each second network node, the serving network node that provides an uplink data transmission resource for the user equipment; and generating a first resource obtaining response according to resource information of the serving network node, and sending the first resource obtaining response to the user equipment.

With reference to the fourth possible implementation of the fifth aspect of the present disclosure, in a fifth possible implementation of the fifth aspect of the present disclosure, the first resource obtaining response further includes a dedicated preamble of a cell of the serving network node and identification information allocated by the serving network node to the user equipment; or the first resource obtaining response further includes identification information allocated by the serving network node to the user equipment and uplink grant information allocated by the serving network node to the user equipment; or the first resource obtaining response further includes identification information allocated by the serving network node to the user equipment, uplink grant information allocated by the serving network node to the user equipment, and synchronization information of the serving network node.

A sixth aspect of the present disclosure discloses a network node, including: a receiving module and a sending module, where:

the receiving module is configured to receive a resource obtaining request sent by user equipment, where the resource obtaining request is used to obtain an uplink data transmission resource; and the sending module is configured to send a resource obtaining response to the user equipment in response to the resource obtaining request.

With reference to the sixth aspect of the present disclosure, in a first possible implementation of the sixth aspect of the present disclosure, the resource obtaining response includes resource selection indication information, and the resource selection indication information is used to indicate an extent to which the network node can accept the resource obtaining request of the user equipment; and the resource selection indication information includes:

uplink grant information allocated by the network node to the user equipment; or load information of the network node; or service indication information of the network node.

A seventh aspect of the present disclosure discloses a network node, including: a processor, a memory, and a communications interface, where the memory stores a set of program code, and the processor is configured to invoke the program code stored in the memory, to perform the following operations:

receiving, by using the communications interface, a first resource obtaining request sent by user equipment, where the first resource obtaining request is used to obtain an uplink data transmission resource; and sending a first resource obtaining response to the user equipment in response to the first resource obtaining request by using the communications interface, where the first resource obtaining response includes node information of a serving network node that is determined by the network node and that provides an uplink data transmission resource for the user equipment.

With reference to the seventh aspect of the present disclosure, in a first possible implementation of the seventh aspect of the present disclosure, the first resource obtaining request includes network node indication information, the network node indication information is used by the network node to determine at least one second network node that can provide an uplink data transmission resource for the user equipment, and the at least one second network node includes the serving network node; and the network node indication information includes:

a node identifier of each second network node; or an identifier of a cell, which can provide an uplink data transmission resource for the user equipment, of each second network node; or location information of the user equipment.

With reference to the first possible implementation of the seventh aspect of the present disclosure, in a second possible implementation of the seventh aspect of the present disclosure, a specific manner of sending, by the processor, a first resource obtaining response to the user equipment in response to the first resource obtaining request by using the communications interface is:

determining the at least one second network node according to the network node indication information;

sending a second resource obtaining request to each second network node by using the communications interface;

receiving, by using the communications interface, a second resource obtaining response that is sent by each second network node for the second resource obtaining request received by the second network node, where each second resource obtaining response includes node information of a second network node sending the second resource obtaining response;

determining, according to each second resource obtaining response, the serving network node that provides an uplink data transmission resource for the user equipment; and generating a first resource obtaining response according to a second resource obtaining response sent by the serving network node, and sending the first resource obtaining response to the user equipment by using the communications interface.

With reference to the second possible implementation of the seventh aspect of the present disclosure, in a third possible implementation of the seventh aspect of the present disclosure, each second resource obtaining response further includes a dedicated preamble of a cell of the second network node sending the second resource obtaining response and identification information allocated by the second network node to the user equipment, and the first resource obtaining response further includes a dedicated preamble of a cell of the serving network node and identification information allocated by the serving network node to the user equipment; or each second resource obtaining response further includes identification information allocated to the user equipment by the second network node sending the second resource obtaining response and uplink grant information allocated by the second network node to the user equipment, and the first resource obtaining response further includes identification information allocated by the serving network node to the user equipment and uplink grant information allocated by the serving network node to the user equipment; or each second resource obtaining response further includes identification information allocated to the user equipment by the second network node sending the second resource obtaining response, uplink grant information allocated by the second network node to the user equipment, and synchronization information of the second network node, and the first resource obtaining response further includes identification information allocated by the serving network node to the user equipment, uplink grant information allocated by the serving network node to the user equipment, and synchronization information of the serving network node.

With reference to the first possible implementation of the seventh aspect of the present disclosure, in a fourth possible implementation of the seventh aspect of the present disclosure, a specific manner of sending, by the processor, a first resource obtaining response to the user equipment in response to the first resource obtaining request by using the communications interface is:

determining the at least one second network node according to the network node indication information;

determining, according to pre-stored resource information of each second network node, the serving network node that provides an uplink data transmission resource for the user equipment; and generating a first resource obtaining response according to resource information of the serving network node, and sending the first resource obtaining response to the user equipment by using the communications interface.

With reference to the fourth possible implementation of the seventh aspect of the present disclosure, in a fifth possible implementation of the seventh aspect of the present disclosure, the first resource obtaining response further includes a dedicated preamble of a cell of the serving network node and identification information allocated by the serving network node to the user equipment; or the first resource obtaining response further includes identification information allocated by the serving network node to the user equipment and uplink grant information allocated by the serving network node to the user equipment; or the first resource obtaining response further includes identification information allocated by the serving network node to the user equipment, uplink grant information allocated by the serving network node to the user equipment, and synchronization information of the serving network node.

An eighth aspect of the present disclosure discloses a network node, including: a processor, a memory, and a communications interface, where the memory stores a set of program code, and the processor is configured to invoke the program code stored in the memory, to perform the following operations:

receiving, by using the communications interface, a resource obtaining request sent by user equipment, where the resource obtaining request is used to obtain an uplink data transmission resource; and sending a resource obtaining response to the user equipment in response to the resource obtaining request by using the communications interface.

With reference to the eighth aspect of the present disclosure, in a first possible implementation of the eighth aspect of the present disclosure, the resource obtaining response includes resource selection indication information, and the resource selection indication information is used to indicate an extent to which the network node can accept the resource obtaining request of the user equipment; and the resource selection indication information includes:

uplink grant information allocated by the network node to the user equipment; or load information of the network node; or service indication information of the network node.

A ninth aspect of the present disclosure discloses an uplink data transmission resource obtaining method, including:

sending, by user equipment, a resource obtaining request to a first network node, where the resource obtaining request is used to obtain an uplink data transmission resource;

receiving, by the user equipment, a resource obtaining response that is sent by the first network node for the resource obtaining request, where the resource obtaining response includes node information of a serving network node;

determining, by the user equipment according to the resource obtaining response, the serving network node that provides an uplink data transmission resource for the user equipment, and determining the uplink data transmission resource that is provided by the serving network node for the user equipment; and sending, by the user equipment, uplink data to the serving network node by using the uplink data transmission resource provided by the serving network node.

With reference to the ninth aspect of the present disclosure, in a first possible implementation of the ninth aspect of the present disclosure, the resource obtaining request includes network node indication information, the network node indication information is used by the first network node to determine at least one second network node that can provide an uplink data transmission resource for the user equipment, and the at least one second network node includes the serving network node; and the network node indication information includes:

a node identifier of each second network node; or an identifier of a cell, which can provide an uplink data transmission resource for the user equipment, of each second network node; or location information of the user equipment.

With reference to the ninth aspect of the present disclosure or the first possible implementation of the ninth aspect of the present disclosure, in a second possible implementation of the ninth aspect of the present disclosure, the resource obtaining response further includes a dedicated preamble of a cell of the serving network node and identification information allocated by the serving network node to the user equipment; or the resource obtaining response further includes identification information allocated by the serving network node to the user equipment and uplink grant information allocated by the serving network node to the user equipment; or the resource obtaining response further includes identification information allocated by the serving network node to the user equipment, uplink grant information allocated by the serving network node to the user equipment, and synchronization information of the serving network node.

With reference to the second possible implementation of the ninth aspect of the present disclosure, in a third possible implementation of the ninth aspect of the present disclosure, when the resource obtaining response further includes the dedicated preamble, the determining, by the user equipment, the uplink data transmission resource that is provided by the serving network node for the user equipment includes:

sending, by the user equipment, a random access request to the serving network node by using the dedicated preamble; and receiving, by the user equipment, a random access response that is sent by the serving network node for the random access request, and determining an uplink data transmission resource included in the random access response as the uplink data transmission resource that is provided by the serving network node for the user equipment.

A tenth aspect of the present disclosure discloses an uplink data transmission resource obtaining method, including:

determining, by user equipment, at least one first network node that can provide an uplink data transmission resource;

sending, by the user equipment, a resource obtaining request to each first network node, where the resource obtaining request is used to obtain an uplink data transmission resource;

receiving, by the user equipment, a resource obtaining response that is sent by each first network node for the resource obtaining request received by the first network node;

selecting, by the user equipment, a first network node as a serving network node according to each resource obtaining response, and determining an uplink data transmission resource that is provided by the serving network node for the user equipment; and sending, by the user equipment, uplink data to the serving network node by using the uplink data transmission resource provided by the serving network node.

With reference to the tenth aspect of the present disclosure, in a first possible implementation of the tenth aspect of the present disclosure, the resource obtaining response includes resource selection indication information, and the resource selection indication information is used to indicate an extent to which the first network node can accept the resource obtaining request of the user equipment; and the resource selection indication information includes:

uplink grant information allocated by the first network node to the user equipment; or load information of the first network node; or service indication information of the first network node.

With reference to the tenth aspect of the present disclosure or the first possible implementation of the tenth aspect of the present disclosure, in a second possible implementation of the tenth aspect of the present disclosure, the determining, by the user equipment, at least one first network node that can provide an uplink data transmission resource includes:

determining, by the user equipment according to measurement results of transmitted and received signal quality of all the first network nodes or service types supported by cells of all the first network nodes, the at least one first network node that can provide an uplink data transmission resource, where all the first network nodes include all first network nodes that can provide an uplink data transmission resource for the user equipment.

An eleventh aspect of the present disclosure discloses an uplink data transmission resource obtaining method, including:

receiving, by a first network node, a first resource obtaining request sent by user equipment, where the first resource obtaining request is used to obtain an uplink data transmission resource; and sending, by the first network node, a first resource obtaining response to the user equipment in response to the first resource obtaining request, where the first resource obtaining response includes node information of a serving network node that is determined by the first network node and that provides an uplink data transmission resource for the user equipment.

With reference to the eleventh aspect of the present disclosure, in a first possible implementation of the eleventh aspect of the present disclosure, the first resource obtaining request includes network node indication information, the network node indication information is used by the first network node to determine at least one second network node that can provide an uplink data transmission resource for the user equipment, and the at least one second network node includes the serving network node; and the network node indication information includes:

a node identifier of each second network node; or an identifier of a cell, which can provide an uplink data transmission resource for the user equipment, of each second network node; or location information of the user equipment.

With reference to the first possible implementation of the eleventh aspect of the present disclosure, in a second possible implementation of the eleventh aspect of the present disclosure, the sending, by the first network node, a first resource obtaining response to the user equipment in response to the first resource obtaining request includes:

determining, by the first network node, the at least one second network node according to the network node indication information;

sending, by the first network node, a second resource obtaining request to each second network node;

receiving, by the first network node, a second resource obtaining response that is sent by each second network node for the second resource obtaining request received by the second network node, where each second resource obtaining response includes node information of a second network node sending the second resource obtaining response;

determining, by the first network node according to each second resource obtaining response, the serving network node that provides an uplink data transmission resource for the user equipment; and generating, by the first network node, a first resource obtaining response according to a second resource obtaining response sent by the serving network node, and sending the first resource obtaining response to the user equipment.

With reference to the second possible implementation of the eleventh aspect of the present disclosure, in a third possible implementation of the eleventh aspect of the present disclosure, each second resource obtaining response further includes a dedicated preamble of a cell of the second network node sending the second resource obtaining response and identification information allocated by the second network node to the user equipment, and the first resource obtaining response further includes a dedicated preamble of a cell of the serving network node and identification information allocated by the serving network node to the user equipment; or each second resource obtaining response further includes identification information allocated to the user equipment by the second network node sending the second resource obtaining response and uplink grant information allocated by the second network node to the user equipment, and the first resource obtaining response further includes identification information allocated by the serving network node to the user equipment and uplink grant information allocated by the serving network node to the user equipment; or each second resource obtaining response further includes identification information allocated to the user equipment by the second network node sending the second resource obtaining response, uplink grant information allocated by the second network node to the user equipment, and synchronization information of the second network node, and the first resource obtaining response further includes identification information allocated by the serving network node to the user equipment, uplink grant information allocated by the serving network node to the user equipment, and synchronization information of the serving network node.

With reference to the first possible implementation of the eleventh aspect of the present disclosure, in a fourth possible implementation of the eleventh aspect of the present disclosure, the sending, by the first network node, a first resource obtaining response to the user equipment in response to the first resource obtaining request includes:

determining, by the first network node, the at least one second network node according to the network node indication information;

determining, by the first network node according to pre-stored resource information of each second network node, the serving network node that provides an uplink data transmission resource for the user equipment; and generating, by the first network node, a first resource obtaining response according to resource information of the serving network node, and sending the first resource obtaining response to the user equipment.

With reference to the fourth possible implementation of the eleventh aspect of the present disclosure, in a fifth possible implementation of the eleventh aspect of the present disclosure, the first resource obtaining response further includes a dedicated preamble of a cell of the serving network node and identification information allocated by the serving network node to the user equipment; or the first resource obtaining response further includes identification information allocated by the serving network node to the user equipment and uplink grant information allocated by the serving network node to the user equipment; or the first resource obtaining response further includes identification information allocated by the serving network node to the user equipment, uplink grant information allocated by the serving network node to the user equipment, and synchronization information of the serving network node.

A twelfth aspect of the present disclosure discloses an uplink data transmission resource obtaining method, including:

receiving, by a first network node, a resource obtaining request sent by user equipment, where the resource obtaining request is used to obtain an uplink data transmission resource; and sending, by the first network node, a resource obtaining response to the user equipment in response to the resource obtaining request.

With reference to the twelfth aspect of the present disclosure, in a first possible implementation of the twelfth aspect of the present disclosure, the resource obtaining response includes resource selection indication information, and the resource selection indication information is used to indicate an extent to which the first network node can accept the resource obtaining request of the user equipment; and the resource selection indication information includes:

uplink grant information allocated by the first network node to the user equipment; or load information of the first network node; or service indication information of the first network node.

A thirteenth aspect of the present disclosure discloses an uplink data transmission resource obtaining system, including: user equipment and a first network node, where:

the user equipment is configured to: send a first resource obtaining request to the first network node, receive a first resource obtaining response that is sent by the first network node for the first resource obtaining request, determine, according to the first resource obtaining response, a serving network node that provides an uplink data transmission resource for the user equipment, determine the uplink data transmission resource that is provided by the serving network node for the user equipment, and send uplink data to the serving network node by using the uplink data transmission resource provided by the serving network node, where the resource obtaining request is used to obtain the uplink data transmission resource, and the resource obtaining response includes node information of the serving network node; and the first network node is configured to receive the first resource obtaining request sent by the user equipment, and send the first resource obtaining response to the user equipment in response to the first resource obtaining request.

With reference to the thirteenth aspect of the present disclosure, in a first possible implementation of the thirteenth aspect of the present disclosure, the first resource obtaining request includes network node indication information, the network node indication information is used by the first network node to determine at least one second network node that can provide an uplink data transmission resource for the user equipment, and the at least one second network node includes the serving network node;

the system further includes the at least one second network node; and the network node indication information includes:

a node identifier of each second network node; or an identifier of a cell, which can provide an uplink data transmission resource for the user equipment, of each second network node; or location information of the user equipment.

With reference to the first possible implementation of the thirteenth aspect of the present disclosure, in a second possible implementation of the thirteenth aspect of the present disclosure, a specific manner of sending, by the first network node, the first resource obtaining response to the user equipment in response to the first resource obtaining request is:

determining the at least one second network node according to the network node indication information;

sending a second resource obtaining request to each second network node;

receiving a second resource obtaining response that is sent by each second network node for the second resource obtaining request received by the second network node, where each second resource obtaining response includes node information of a second network node sending the second resource obtaining response;

determining, according to each second resource obtaining response, the serving network node that provides an uplink data transmission resource for the user equipment; and generating a first resource obtaining response according to a second resource obtaining response sent by the serving network node, and sending the first resource obtaining response to the user equipment; and the second network node is configured to send the second resource obtaining response to the first network node for the second resource obtaining request received by the second network node.

With reference to the second possible implementation of the thirteenth aspect of the present disclosure, in a third possible implementation of the thirteenth aspect of the present disclosure, each second resource obtaining response further includes a dedicated preamble of a cell of the second network node sending the second resource obtaining response and identification information allocated by the second network node to the user equipment, and the first resource obtaining response further includes a dedicated preamble of a cell of the serving network node and identification information allocated by the serving network node to the user equipment; or each second resource obtaining response further includes identification information allocated to the user equipment by the second network node sending the second resource obtaining response and uplink grant information allocated by the second network node to the user equipment, and the first resource obtaining response further includes identification information allocated by the serving network node to the user equipment and uplink grant information allocated by the serving network node to the user equipment; or each second resource obtaining response further includes identification information allocated to the user equipment by the second network node sending the second resource obtaining response, uplink grant information allocated by the second network node to the user equipment, and synchronization information of the second network node, and the first resource obtaining response further includes identification information allocated by the serving network node to the user equipment, uplink grant information allocated by the serving network node to the user equipment, and synchronization information of the serving network node.

With reference to the first possible implementation of the thirteenth aspect of the present disclosure, in a fourth possible implementation of the thirteenth aspect of the present disclosure, a specific manner of sending, by the first network node, the first resource obtaining response to the user equipment in response to the first resource obtaining request is:

determining the at least one second network node according to the network node indication information;

determining, according to pre-stored resource information of each second network node, the serving network node that provides an uplink data transmission resource for the user equipment; and generating a first resource obtaining response according to resource information of the serving network node, and sending the first resource obtaining response to the user equipment.

With reference to the fourth possible implementation of the thirteenth aspect of the present disclosure, in a fifth possible implementation of the thirteenth aspect of the present disclosure, the first resource obtaining response further includes a dedicated preamble of a cell of the serving network node and identification information allocated by the serving network node to the user equipment; or the first resource obtaining response further includes identification information allocated by the serving network node to the user equipment and uplink grant information allocated by the serving network node to the user equipment; or the first resource obtaining response further includes identification information allocated by the serving network node to the user equipment, uplink grant information allocated by the serving network node to the user equipment, and synchronization information of the serving network node.

With reference to the third possible implementation or the fifth possible implementation of the thirteenth aspect of the present disclosure, in a sixth possible implementation of the thirteenth aspect of the present disclosure, when the first resource obtaining response further includes the dedicated preamble, a specific manner of determining, by the user equipment, the uplink data transmission resource that is provided by the serving network node for the user equipment is:

sending a random access request to the serving network node by using the dedicated preamble; and receiving a random access response that is sent by the serving network node for the random access request, and determining an uplink data transmission resource included in the random access response as the uplink data transmission resource that is provided by the serving network node for the user equipment.

A fourteenth aspect of the present disclosure discloses an uplink data transmission resource obtaining system, including: user equipment and at least one first network node, where:

the user equipment is configured to determine the at least one first network node that can provide an uplink data transmission resource, send a resource obtaining request to each first network node, receive a resource obtaining response that is sent by each first network node for the resource obtaining request received by the first network node, select a first network node as a serving network node according to each resource obtaining response, determine an uplink data transmission resource that is provided by the serving network node for the user equipment, and send uplink data to the serving network node by using the uplink data transmission resource provided by the serving network node, where the resource obtaining request is used to obtain the uplink data transmission resource; and the first network node is configured to receive the resource obtaining request sent by the user equipment, and send the resource obtaining response to the user equipment in response to the resource obtaining request.

With reference to the fourteenth aspect of the present disclosure, in a first possible implementation of the fourteenth aspect of the present disclosure, the resource obtaining response includes resource selection indication information, and the resource selection indication information is used to indicate an extent to which the first network node can accept the resource obtaining request of the user equipment; and the resource selection indication information includes:

uplink grant information allocated by the first network node to the user equipment; or load information of the first network node; or service indication information of the first network node.

With reference to the fourteenth aspect of the present disclosure or the first possible implementation of the fourteenth aspect of the present disclosure, in a second possible implementation of the fourteenth aspect of the present disclosure, a specific manner of determining, by the user equipment, the at least one first network node that can provide an uplink data transmission resource is:

determining, according to measurement results of transmitted and received signal quality of all the first network nodes or service types supported by cells of all the first network nodes, the at least one first network node that can provide an uplink data transmission resource, where all the first network nodes include all first network nodes that can provide an uplink data transmission resource for the user equipment.

In the embodiments of the present disclosure, user equipment sends a resource obtaining request to a first network node, and receives a resource obtaining response that is returned by the first network node for the resource obtaining request. The resource obtaining request is used to obtain an uplink data transmission resource used to transmit uplink data. The user equipment determines, according to the received resource obtaining response, a serving network node that provides an uplink data transmission resource for the user equipment, and determines the uplink data transmission resource that is provided by the serving network node for the user equipment. The user equipment sends uplink data by using the uplink data transmission resource provided by the serving network node. By means of the embodiments of the present disclosure, the user equipment accesses the serving network node selected by the first network node for the user equipment, thereby quickly and effectively obtaining the uplink data transmission resource used to transmit the uplink data.

As can be seen, by means of the present disclosure, the user equipment accesses a network node selected from multiple network nodes, thereby quickly and effectively obtaining an uplink data transmission resource used to transmit uplink data.

It should be noted that, in the foregoing embodiments, the descriptions of the embodiments have respective focuses. For a part that is not described in detail in an embodiment, refer to related descriptions in other embodiments. In addition, a person skilled in the art should also appreciate that all the embodiments described in the specification are examples of embodiments, and the related actions and modules are not necessarily mandatory to the present disclosure.

A sequence of the steps of the method in the embodiments of the present disclosure may be adjusted, and certain steps may also be merged or removed according to an actual need.

Merging, division, and removing may be performed on the modules in the user equipment and the network node in the embodiments of the present disclosure according to an actual need.

Merging, division, and removing may be performed on the modules in the user equipment in the embodiments of the present disclosure according to an actual need.

Merging, division, and removing may be performed on the modules in the network node in the embodiments of the present disclosure according to an actual need.

The modules of the embodiments of the present disclosure may be executed by a universal integrated circuit, such as a central processing unit (CPU) or an application-specific integrated circuit (ASIC).

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The uplink data transmission resource obtaining method and system, and the device that are disclosed in the embodiments of the present disclosure are detailed above. In this specification, specific examples are used to describe the principle and implementations of the present disclosure, and the descriptions of the embodiments are only intended to help understand the present disclosure and the core idea of the present disclosure. Meanwhile, a person of ordinary skill in the art may, based on the idea of the present disclosure, make modifications with respect to the specific implementations and the application scope. Therefore, the content of this specification shall not be construed as a limitation to the present disclosure.

What is claimed is:

1. A user equipment for transmitting data, comprising: a processor, a memory storing program code that is executable by the processor, and a communications interface, wherein executing the program code facilitates performing steps comprising:
    determining a plurality of first network nodes that provides uplink data transmission resources;
    sending, by the communications interface, a resource obtaining request to the plurality of first network nodes, wherein the resource obtaining request sent to a respective first network node is used to obtain an uplink data transmission resource for sending uplink data;
    receiving, by the communications interface, resource obtaining responses from the plurality of first network nodes in response to the resource obtaining request;
    selecting, from the plurality of first network nodes, a serving network node according to the resource obtaining responses;
    determining that the uplink data transmission resource for sending the uplink data is an uplink data transmission resource received from the serving network node; and
    sending, by the communications interface, the uplink data to the serving network node using the uplink data transmission resource received from the serving network node.

2. The user equipment according to claim 1, wherein a respective resource obtaining response in the resource obtaining responses comprises:
    resource selection indication information for indicating an extent to which a respective first network node in the plurality of first network nodes can accept the resource obtaining request of the user equipment, wherein the resource selection indication information comprises: load information of the respective first network node.

3. The user equipment according to claim 1, wherein executing the program code further facilitates performing:
    determining, according to measurement results of transmitted and received signal quality of all first network nodes in the plurality of first network nodes or according to service types supported by cells of all first network nodes in the plurality of network nodes, the serving network node that provides the uplink data transmission resource for sending the uplink data.

4. The user equipment according to claim 1, wherein a respective resource obtaining response in the resource obtaining responses comprises at least one of:
    a dedicated preamble of a cell of the serving network node and identification information allocated by the serving network node to the user equipment;
    the identification information allocated by the serving network node to the user equipment and uplink grant information allocated by the serving network node to the user equipment; and
    the identification information allocated by the serving network node to the user equipment, the uplink grant information allocated by the serving network node to the apparatus, and synchronization information of the serving network node.

5. The user equipment according to claim 4, wherein, when the resource obtaining response of the serving network node comprises the dedicated preamble, executing the program code further facilitates performing:
    sending, by the communications interface, a random access request to the serving network node by using the dedicated preamble;
    receiving, by the communications interface, a random access response from the serving network node in response to the random access request; and
    determining a received uplink data transmission resource comprised in the random access response as the uplink data transmission resource that is provided by the serving network node to the user equipment.

6. The user equipment according to claim 1, wherein a respective resource obtaining response in the resource obtaining responses comprises:
    resource selection indication information for indicating an extent to which a respective first network node in the plurality of first network nodes can accept the resource obtaining request of the user equipment, wherein the resource selection indication information comprises at least one of:
    uplink grant information allocated by the respective first network node to the user equipment; and
    service indication information of the respective first network node.

7. The user equipment according to claim 1, wherein at least one first network node in the plurality of first network nodes has multiple cells.

8. A first network node in a plurality of network nodes, the first network node comprising: a processor, a memory storing program code that is executable by the processor, and a communications interface, wherein executing the program code facilitates performing steps comprising:
    receiving, by the communications interface, a resource obtaining request from a user equipment, wherein the resource obtaining request is used to obtain an uplink data transmission resource for sending uplink data;

sending, by the communications interface, the resource obtaining request to the plurality of network nodes, wherein the resource obtaining request sent to a respective network node in the plurality of network nodes is used to obtain an uplink data transmission resource for sending the uplink data;

receiving, by the communications interface, second resource obtaining responses from the plurality of network nodes in response to the resource obtaining request;

selecting, from the plurality of second network nodes, a serving network node according to the second resource obtaining responses;

generating a first resource obtaining response according to a second resource obtaining response received from the serving network node; and sending, by the communications interface, the first resource obtaining response to the user equipment for sending the uplink data.

9. The first network node according to claim 8, wherein a respective second resource obtaining response in the second resource obtaining responses comprises:
resource selection indication information for indicating an extent to which a respective network node in the plurality of network nodes can accept the resource obtaining request, wherein the resource selection indication information comprises at least one of:
load information of the respective network node.

10. The first network node according to claim 8, wherein the first resource obtaining response comprises at least one of:
a dedicated preamble of a cell of the serving network node for the user equipment and identification information allocated by the serving network node to the user equipment;
the identification information allocated by the serving network node for the user equipment and uplink grant information allocated by the serving network node to the user equipment; and
the identification information allocated by the serving network node for the user equipment, the uplink grant information allocated by the serving network node to the user equipment, and synchronization information of the serving network node.

11. The first network node according to claim 10, wherein when the first resource obtaining response comprises the dedicated preamble, executing the program code further facilitates performing:
sending a random access request to the serving network node by using the dedicated preamble; and
receiving a random access response from the serving network node in response to the random access request, wherein a received uplink data transmission resource comprised in the random access response is determined as the uplink data transmission resource that is provided by the serving network node for the user equipment.

12. The first network node according to claim 8, wherein a respective second resource obtaining response in the second resource obtaining responses comprises:
resource selection indication information for indicating an extent to which a respective network node in the plurality of first network nodes can accept the resource obtaining request, wherein the resource selection indication information comprises at least one of:
uplink grant information allocated by the respective network node to the user equipment; and
service indication information of the respective network node.

13. The first network node according to claim 8, wherein the first network node has multiple cells.

14. A method for transmitting data performed by a user equipment, the method comprising:
determining a plurality of first network nodes that provides uplink data transmission resources;
sending a resource obtaining request to the plurality of first network nodes, wherein the resource obtaining request sent to a respective first network node is used to obtain a uplink data transmission resource for sending uplink data;
receiving resource obtaining responses from the plurality of first network nodes in response to the resource obtaining request;
determining, according to the received resource obtaining responses, a serving network node in the plurality of first network nodes;
determining that the uplink data transmission resource for sending the uplink data is the uplink data transmission resource received from the serving network node; and
sending the uplink data to the serving network node using the uplink data transmission resource received from the serving network node.

15. The method according to claim 14, wherein a respective resource obtaining response in the resource obtaining responses comprises:
resource selection indication information for indicating an extent to which a respective first network node in the plurality of first network nodes can accept the resource obtaining request of the user equipment, wherein the resource selection indication information comprises:
load information of the respective first network node.

16. The method according to claim 14, further comprising:
determining, according to measurement results of transmitted and received signal quality of all first network nodes in the plurality of first network nodes or according to service types supported by cells of the first network nodes in the plurality of network nodes, the serving network node that provides the uplink data transmission resource for sending the uplink data.

17. The method according to claim 14, wherein a resource obtaining response of the serving network node comprises at least one of:
a dedicated preamble of a cell of the serving network node and identification information allocated by the serving network node to the user equipment;
the identification information allocated by the serving network node to the apparatus and uplink grant information allocated by the serving network node to the user equipment; and
the identification information allocated by the serving network node to the user equipment, the uplink grant information allocated by the serving network node to the user equipment, and synchronization information of the serving network node.

18. The method according to claim 17, wherein when the resource obtaining response of the serving network node comprises the dedicated preamble, the method further comprises:
sending a random access request to the serving network node by using the dedicated preamble;
receiving a random access response from the serving network node in response to the random access request; and determining a received uplink data transmission resource comprised in the random access response as the uplink data transmission resource that is provided by the serving network node to user equipment.

19. The method according to claim 14, wherein a respective resource obtaining response in the resource obtaining responses comprises:
   resource selection indication information for indicating an extent to which a respective first network node in the plurality of first network nodes can accept the resource obtaining request of the user equipment, wherein the resource selection indication information comprises at least one of:
      uplink grant information allocated by the respective first network node to the user equipment; and
      service indication information of the respective first network node.

20. The method according to claim 14, wherein at least one first network node in the plurality of first network nodes has multiple cells.

* * * * *